US012224885B1

(12) United States Patent
Bar-Or Tillinger et al.

(10) Patent No.: US 12,224,885 B1
(45) Date of Patent: Feb. 11, 2025

(54) MACHINE LEARNING BASED CHANNEL PRECODER SELECTION FOR DOWNLINK

(71) Applicant: QUALCOMM Incorporated, San Diego, CA (US)

(72) Inventors: Amit Bar-Or Tillinger, Tel-Aviv (IL); Shay Landis, Hod Hasharon (IL); Idan Michael Horn, Hod Hasharon (IL); Jacob Pick, Mevaseret Zion (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/447,942

(22) Filed: Aug. 10, 2023

(51) Int. Cl.
*H04L 5/12* (2006.01)
*H04L 25/02* (2006.01)
*H04W 28/18* (2009.01)
*H04W 72/1273* (2023.01)

(52) U.S. Cl.
CPC ......... *H04L 25/0254* (2013.01); *H04W 28/18* (2013.01); *H04W 72/1273* (2013.01)

(58) Field of Classification Search
CPC ............... H04L 25/0254; H04W 28/18; H04W 72/1273
USPC ....................................................... 375/262
See application file for complete search history.

(56) References Cited

U.S. PATENT DOCUMENTS

| | | | |
|---|---|---|---|
| 11,916,754 B2* | 2/2024 | Zhu | H04L 41/145 |
| 2018/0324888 A1* | 11/2018 | Shi | H04W 76/27 |
| 2022/0368570 A1* | 11/2022 | Lee | H04L 25/0254 |

FOREIGN PATENT DOCUMENTS

WO    WO-2024128907 A1 *  6/2024

* cited by examiner

*Primary Examiner* — Helene E Tayong
(74) *Attorney, Agent, or Firm* — Holland & Hart LLP

(57) ABSTRACT

Methods, systems, and devices for wireless communications are described. A user equipment (UE) may transmit neural network (NN) capability information to a network entity. The network entity may train the NN model by selecting a NN-based precoder and generating associated coefficients. The network entity may transmit an indication of the precoder coefficients to the UE. The network entity may transmit demodulation reference signals (DMRSs) that have not been precoded and a physical downlink shared channel (PDSCH) signal that has been narrowband-precoded according to the indicated precoder. The UE may then perform and input a channel estimation to the NN model. The NN model may output the narrowband precoder, which the UE may use to generate a narrowband channel estimate and demodulate the narrowband precoded PDSCH signal. In some examples, the network entity may update NN coefficients and may indicate the updated NN coefficients to the UE.

30 Claims, 15 Drawing Sheets

MACHINE LEARNING BASED CHANNEL PRECODER SELECTION FOR DOWNLINK

FIELD OF TECHNOLOGY

The following relates to wireless communications, including machine learning based channel precoder selection for downlink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support machine learning based channel precoder selection for downlink. For example, the described techniques provide for a network entity that may support neural network (NN) based channel precoding selection for increased data communications performance. A network entity may select (e.g., calculate) a precoder (e.g., a narrowband precoder for narrowband precoding and transmission of physical downlink shared channel (PDSCH) transmissions). A user equipment (UE) may transmit NN capability information to the network entity (e.g., indicating supported precoders, supported NN models, etc.). The network entity may utilize this capability information and any other restrictions indicated by the UE to train the NN model and generate NN coefficients (e.g., for a given NN model). The network entity may transmit an indication of the precoder coefficients associated with the trained NN model to the UE. The network entity may transmit demodulation reference signals (DMRSs) that have not been precoded (e.g., or that has been wideband-precoded) and a PDSCH transmission that has been narrowband-precoded. The UE may then perform channel estimation (e.g., using the DMRSs), and input the channel estimation to the NN model (e.g., according to the coefficients indicated by the network entity). The NN model may output an indication of the narrowband precoder, which the UE may use to generate a narrowband channel estimate and demodulate the narrowband precoded PDSCH transmission. In some examples, the network entity may update NN coefficients (e.g., based on sounding reference signals (SRSs) received from the UE and channel estimation at the network entity), and may indicate the updated NN coefficients (e.g., periodically) to the UE.

A method for wireless communications by a UE is described. The method may include transmitting a capability message indicating one or more NN characteristics supported by the UE, receiving, based on transmitting the capability message, a NN characteristic message indicating one or more NN coefficients of a NN model corresponding to precoder calculation based on channel estimation, receiving downlink signaling and one or more DMRSs, where a narrowband precoder corresponding to the downlink signaling is different than a precoding status corresponding to the one or more DMRSs, and decoding the downlink signaling according to an output from the NN model indicating the narrowband precoder of the downlink signaling, wherein the output from the NN model is based on the one or more NN coefficients and an input to the NN model including one or more channel estimation values.

A UE for wireless communications is described. The UE may include one or more memories storing processor executable code, and one or more processors coupled with the one or more memories. The one or more processors may individually or collectively operable to execute the code to cause the UE to transmit a capability message indicating one or more NN characteristics supported by the UE, receive, based on transmitting the capability message, a NN characteristic message indicating one or more NN coefficients of a NN model corresponding to precoder calculation based on channel estimation, receive downlink signaling and one or more DMRSs, where a narrowband precoder corresponding to the downlink signaling is different than a precoding status corresponding to the one or more demodulation reference signals, and decode the downlink signaling according to an output from the NN model indicating the narrowband precoder of the downlink signaling, wherein the output from the NN model is based on the one or more NN coefficients and an input to the NN model including one or more channel estimation values.

Another UE for wireless communications is described. The UE may include means for transmitting a capability message indicating one or more NN characteristics supported by the UE, means for receiving, based on transmitting the capability message, a NN characteristic message indicating one or more NN coefficients of a NN model corresponding to precoder calculation based on channel estimation, means for receiving downlink signaling and one or more DMRSs, where a narrowband precoder corresponding to the downlink signaling is different than a precoding status corresponding to the one or more DMRSs, and means for decoding the downlink signaling according to an output from the NN model indicating the narrowband precoder of the downlink signaling, wherein the output from the NN model is based on the one or more NN coefficients and an input to the NN model including one or more channel estimation values.

A non-transitory computer-readable medium storing code for wireless communications is described. The code may include instructions executable by a processor to transmit a capability message indicating one or more NN characteristics supported by the UE, receive, based on transmitting the capability message, a NN characteristic message indicating one or more NN coefficients of a NN model corresponding to precoder calculation based on channel estimation, receive downlink signaling and one or more DMRSs, where a narrowband precoder corresponding to the downlink signaling is different than a precoding status corresponding to the one or more DMRSs, and decode the downlink signaling according to an output from the NN model indicating the narrowband precoder of the downlink signaling, wherein the output from the neural network model is based at least in part on the one or more NN coefficients and an input to the NN model including one or more channel estimation values Some examples of the method, UEs, and non-transitory computer-readable medium described herein may further include operations, features, means, or instructions for transmitting, via the capability message, an indication of a quantity of layers of the NN model, a connectivity value of the NN model supported by the UE, or a combination thereof.

Some examples of the method, UEs, and non-transitory computer-readable medium described herein may further include operations, features, means, or instructions for transmitting, via the capability message, an indication of one or more precoders that the UE supports for decoding the downlink signaling, the one or more precoders including the narrowband precoder of the downlink signaling.

Some examples of the method, UEs, and non-transitory computer-readable medium described herein may further include operations, features, means, or instructions for receiving control signaling indicating a mapping between the output of the NN model and one or more precoders including the narrowband precoder and selecting the narrowband precoder from the one or more precoders according to the output of the NN model based on the mapping, where decoding the downlink signaling may be based on the selecting.

Some examples of the method, UEs, and non-transitory computer-readable medium described herein may further include operations, features, means, or instructions for receiving control signaling indicating a granularity of the narrowband precoder indicated by the output of the NN model, where decoding the downlink signaling may be based on applying the narrowband precoder according to the indicated granularity.

Some examples of the method, UEs, and non-transitory computer-readable medium described herein may further include operations, features, means, or instructions for performing a channel estimate according to the one or more DMRSs, inputting one or more parameter values corresponding to the channel estimate into the NN model, calculating the narrowband precoder for the downlink signaling according to the output indicating the narrowband precoder, and where demodulating the downlink signaling may be based on the channel estimate and the calculated narrowband precoder.

Some examples of the method. UEs, and non-transitory computer-readable medium described herein may further include operations, features, means, or instructions for transmitting one or more reference signals, receiving, based on transmitting the one or more reference signals, a second NN characteristic message indicating one or more updated NN coefficients of the NN model, and transmitting a feedback message indicating successful receipt of the second NN characteristic message, where receiving the downlink signaling may be based on the one or more updated NN coefficients of the NN model.

In some examples of the method, UEs, and non-transitory computer-readable medium described herein, the precoding status of the one or more DMRSs may be associated with a wideband precoder that may be different than the narrowband precoder.

In some examples of the method, UEs, and non-transitory computer-readable medium described herein, the one or more DMRSs may be not precoded according to the precoding status of the one or more DMRSs.

A method for wireless communications by a network entity is described. The method may include receiving a capability message indicating one or more NN characteristics supported by a UE, transmitting, based on receiving the capability message, a NN characteristic message indicating one or more NN coefficients of a NN model corresponding to precoder calculation based on channel estimation, precoding downlink signaling according to a narrowband precoder, where a precoding status corresponding to one or more DMRSs is different than the narrowband precoder, and transmitting the downlink signaling and the one or more DMRSs.

A network entity for wireless communications is described. The network entity may include one or more memories storing processor executable code, and one or more processors coupled with the one or more memories. The one or more processors may individually or collectively operable to execute the code to cause the network entity to receive a capability message indicating one or more NN characteristics supported by a UE, transmit, based on receiving the capability message, a NN work characteristic message indicating one or more NN coefficients of a NN model corresponding to precoder calculation based on channel estimation, precode downlink signaling according to a narrowband precoder, where a precoding status corresponding to one or more DMRSs is different than the narrowband precoder, and transmit the downlink signaling and the one or more DMRSs.

Another network entity for wireless communications is described. The network entity may include means for receiving a capability message indicating one or more NN characteristics supported by a UE, means for transmitting, based on receiving the capability message, a NN characteristic message indicating one or more NN coefficients of a NN model corresponding to precoder calculation based on channel estimation, means for precoding downlink signaling according to a narrowband precoder, where a precoding status corresponding to one or more DMRSs is different than the narrowband precoder, and means for transmitting the downlink signaling and the one or more DMRSs.

A non-transitory computer-readable medium storing code for wireless communications is described. The code may include instructions executable by a processor to receive a capability message indicating one or more NN characteristics supported by a UE, transmit, based on receiving the capability message, a NN characteristic message indicating one or more NN coefficients of a NN model corresponding to precoder calculation based on channel estimation, precode downlink signaling according to a narrowband precoder, where a precoding status corresponding to one or more DMRSs is different than the narrowband precoder, and transmit the downlink signaling and the one or more DMRSs.

Some examples of the method, network entities, and non-transitory computer-readable medium described herein may further include operations, features, means, or instructions for receiving, via the capability message, an indication of a quantity of layers of the NN model, a connectivity value of the NN model, or a combination thereof, where the one or more NN coefficients may be based on the quantity of layers, the connectivity value, or both.

Some examples of the method, network entities, and non-transitory computer-readable medium described herein may further include operations, features, means, or instructions for receiving, via the capability message, an indication of one or more precoders that the UE supports for decoding the downlink signaling, the one or more precoders including the narrowband precoder of the downlink signaling.

Some examples of the method, network entities, and non-transitory computer-readable medium described herein may further include operations, features, means, or instructions for transmitting control signaling including a set of candidate precoders including the one or more precoders, where receiving the capability message may be based on transmitting the control signaling including the set of candidate precoders.

Some examples of the method, network entities, and non-transitory computer-readable medium described herein may further include operations, features, means, or instructions for transmitting control signaling indicating a mapping between an output of the NN model and one or more precoders including the narrowband precoder.

Some examples of the method, network entities, and non-transitory computer-readable medium described herein may further include operations, features, means, or instructions for transmitting control signaling indicating a granularity of the narrowband precoder indicated by an output of the NN model.

Some examples of the method, network entities, and non-transitory computer-readable medium described herein may further include operations, features, means, or instructions for receiving one or more reference signals from the UE, performing a channel estimation based on the one or more reference signals, updating the one or more NN coefficients of the NN model based on the channel estimation, transmitting a second NN characteristic message indicating the one or more updated NN coefficients of the NN model, and receiving a feedback message indicating successful receipt of the second NN characteristic message.

In some examples of the method, network entities, and non-transitory computer-readable medium described herein, the precoding status of the one or more DMRSs may be associated with a wideband precoder that may be different than the narrowband precoder.

In some examples of the method, network entities, and non-transitory computer-readable medium described herein, the one or more DMRSs may be not precoded according to the precoding status of the one or more DMRSs.

DETAILED DESCRIPTION

Figure 1:
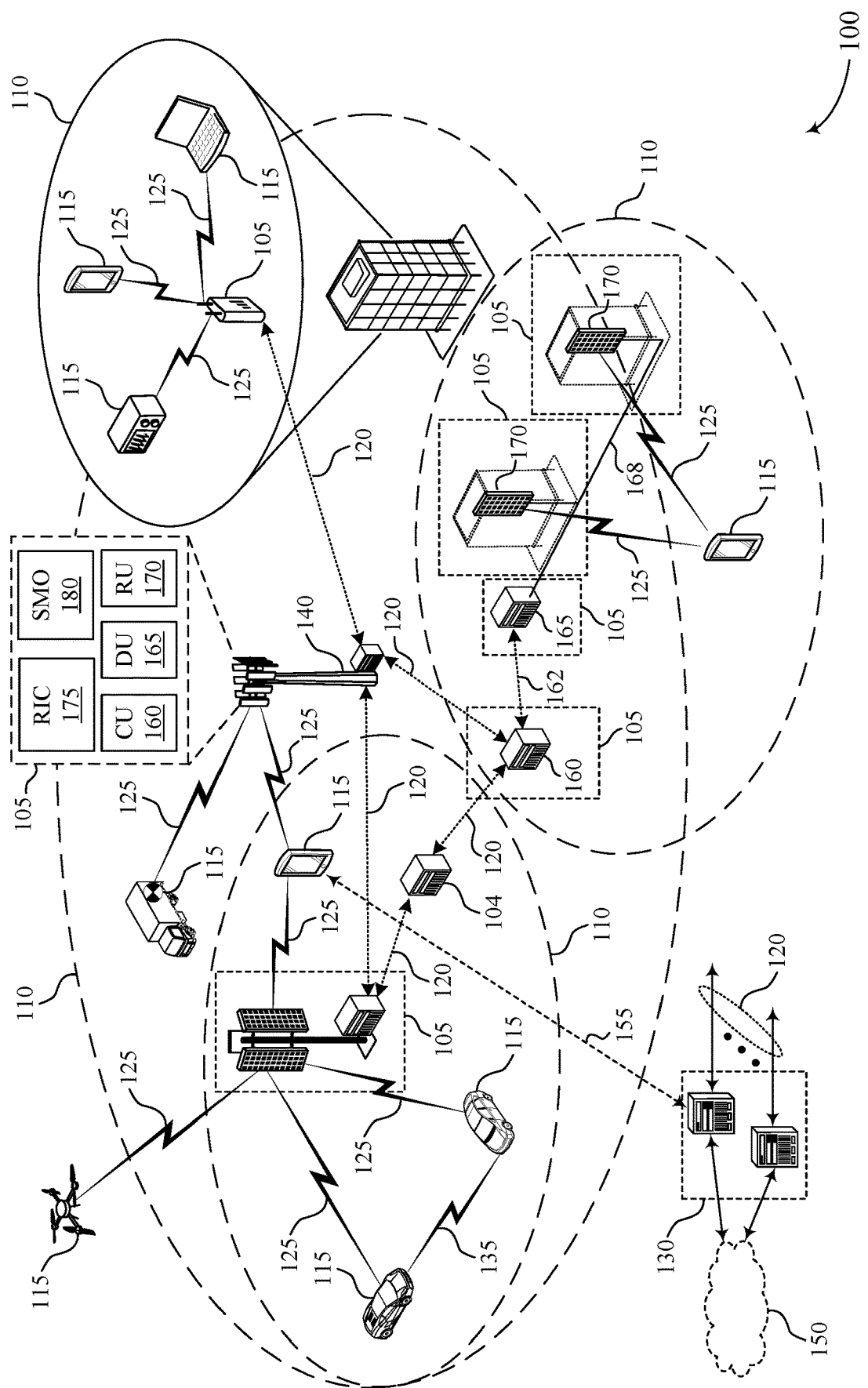
FIG. 1 shows an example of a wireless communications system that supports machine learning based channel precoder selection for downlink in accordance with one or more aspects of the present disclosure.

Wireless communications systems may support communications between a user equipment (UE) and a network entity. In some examples, the network entity may encode downlink signaling according to a precoder (e.g., using a precoding matrix). Precoding design may support increased channel throughput, suppression of interference and distortion, and power reduction. The network entity may encode and transmit demodulated reference signals (DMRSs) and physical downlink shared channel (PDSCH) transmission via a given physical resource block (PRB) according to a single precoder. The UE may have no access to information regarding which precoders are selected and used by the network entity. As a result, wireless signaling may experience performance degradation because channel response may vary across resources blocks (RBs) of a physical resource block group (PRG), and therefore the same precoder applied to multiple RBs may result in low resolution of the precoder. However, narrowband precoders (e.g., for low PRG sizes) may result in poor estimation quality for subcarriers near PRG boundaries (e.g., especially for large delay spread channels). Thus, increased PRG size for precoders results in poor precoder resolution, and small PRG size for precoders result in poor channel estimation at PRG boundaries. The UE may be able to improve channel estimation for narrowband precoded transmissions with access to information regarding which precoders were used to precode the channel, however, indicating such precoder information to the UE by the network entity may result in significant signaling overhead, increasing system latency and power consumption, and decreasing efficiency and user experience.

In some implementations, a network entity may support neural network (NN) based channel precoding selection for improved data communications performance. For example, a network entity may select (e.g., calculate) a precoder (e.g., a narrowband precoder for narrowband precoding and transmission of PDSCHs). The UE may transmit NN capability information to the network entity (e.g., indicating supported precoders, supported NN models, etc.). The network entity may utilize this capability information and other restrictions indicated by the UE to train the NN model and generate coefficients. The network entity may transmit an indication of the precoder coefficients associated with the trained NN model to the UE. The network entity may transmit DMRSs that have not been precoded (e.g., or that has been wideband-precoded) and a PDSCH signal that has been narrowband-precoded. The UE may then perform channel estimation (e.g., using the DMRSs), and input the channel estimation to the NN model (e.g., according to the coefficients indicated by the network entity). The NN model may output the narrowband precoder, which the UE may use to generate a narrowband channel estimate and demodulate the narrowband precoded PDSCH signal. In some examples, the network entity may update NN coefficients (e.g., based on sounding reference signals (SRSs) from the UE and channel estimation at the network entity), and may indicate the updated NN coefficients (e.g., periodically) to the UE.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to machine learning based channel precoder selection for downlink.

FIG. 1 shows an example of a wireless communications system 100 that supports machine learning based channel precoder selection for downlink in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support machine learning based channel precoder selection for downlink as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the network entity 105 may support neural network (NN) based channel precoding selection for increased data communications performance. For example, the network entity 105 may select (e.g., calculate) a precoder (e.g., a narrowband precoder for narrowband precoding and transmission of PDSCHs). The UE 115 may transmit NN capability information to the network entity (e.g., indicating supported precoders, supported NN models, etc.). The network entity 105 may utilize this capability information and other restrictions indicated by the UE 115 to train the NN model and generate coefficients. The network entity 105 may transmit an indication of the precoder coefficients associated with the trained NN model to the UE 115. The network entity 105 may transmit DMRSs that have not been precoded (e.g., or that has been wideband-precoded) and a PDSCH signal that has been narrowband-precoded. The UE 115 may then perform channel estimation (e.g., using the DMRSs), and input the channel estimation to the NN model (e.g., according to the coefficients indicated by the network entity 105). The NN model may output the narrowband precoder, which the UE 115 may use to generate a narrowband channel estimate and demodulate the narrowband precoded PDSCH signal. In some examples, the network entity 105 may update NN coefficients (e.g., based on SRSs from the UE 115 and channel estimation at the network entity 105), and may indicate the updated NN coefficients (e.g., periodically) to the UE 115.

Figure 2:
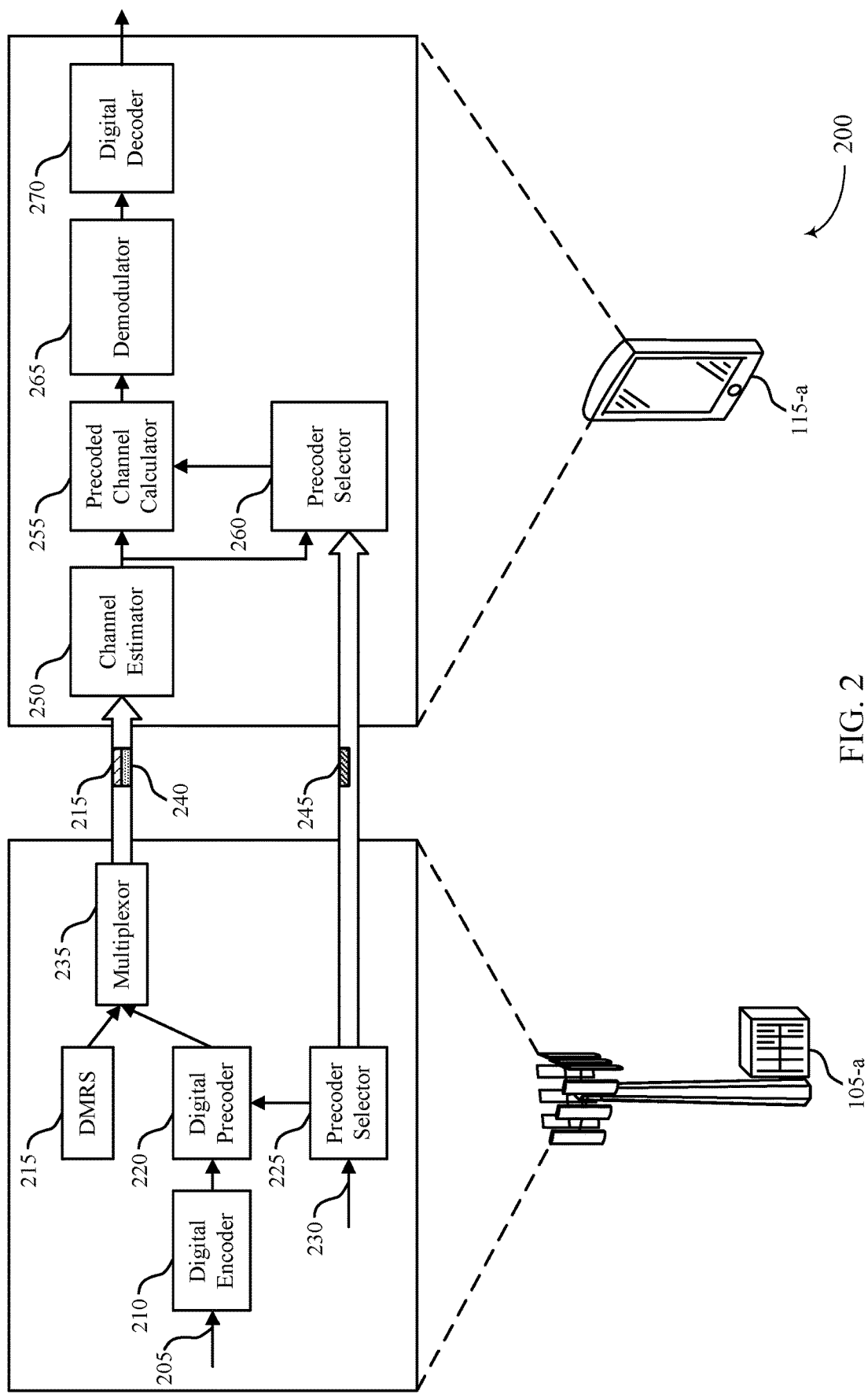
FIG. 2 shows an example of a wireless communication system that supports machine learning based channel precoder selection for downlink in accordance with one or more aspects of the present disclosure.

FIG. 2 shows an example of a wireless communication system 200 that supports machine learning based channel precoder selection for downlink in accordance with one or more aspects of the present disclosure. The wireless communications system 200 may implement or may be implemented by aspects of the wireless communications system 100. For example, the wireless communications system 200 may include a UE 115-a and a network entity 105-a, which may be examples of corresponding devices as described with reference to FIG. 1.

The network entity 105-a and the UE 115-a may support channel precoding. Channel precoding design may be an important component of the wireless communication system 200. Improvement of various channel precoding processes may enable channel adaptive techniques at a transmitting device (e.g., the network entity 105-a), which may improve one or more criteria of the wireless communications system 200. For example, channel precoding techniques may increase channel capacity (e.g., throughput) between the network entity 105-a and the UE 115-a. In some examples, channel precoding may enable the UE 115-a to mitigate (e.g., suppress) various interferences, such as inter-UE interference, which may occur at the UE 115-a, such as interferences associated with multiple-user, multiple-input, multiple output (MU-MIMO) scenarios. In some examples, channel precoding may support a reduced quantity of receiver antennas (e.g., at the UE 115-a), which may further result in a decrease in power consumption by the UE 115-a. In some examples, channel precoding may enable a transmitter (e.g., the network entity 105-a) to suppress distortion that may result from low resolution digital-to-analog converters (DAC).

While channel precoding techniques may be beneficial to both the network entity 105-a and the UE 115-a, some channel precoding techniques may be subject to one or more restrictions. For example, precoding techniques may be subject to a threshold allowed or supported transmission power, a threshold transmission power per antenna, nonlinear power amplifiers, or inter-cell interference. Such limitations may degrade or limit the efficiency gains resulting from the channel precoding.

Some examples of channel precoding techniques may result in performance degradation. For example, in some approaches the network entity 105-a may apply a narrowband precoder (e.g., for downlink signaling) for both demodulated reference signals (DMRSs) and one or more physical downlink shared channels (PDSCHs) of a physical resource block (PRB) (e.g., the DMRSs and the PDSCHs may be precoded according to a single narrowband precoder). However, the UE 115-a may not have access to any information regarding which precoding has been applied by the network entity 105-a. As a result, wireless signaling may experience performance degradation. For example, channel quality may vary across RBs of a single PRG. If the same precoder applied to multiple RBs (e.g., a single precoding matrix applied to multiple RBs of a given PRG size), then the network entity 105-a and the UE 115-a may experience performance degradation due to low resolution of the precoder. Additionally, or alternatively, the use of a narrowband precoder for both the DMRSs and one or more PDSCHs (e.g., for low PRG sizes), may result in performance degradation due to poor estimation quality. For example, channel estimation quality for subcarriers near PRG boundaries may degrade (e.g., especially for large delay spread channels). Thus, increased PRG size for precoders applied to DMRSs and PDSCHs may result in poor precoder resolution, and small PRG size for precoders applied to DMRSs and PDSCHs may result in poor channel estimation at PRG boundaries. Additionally, the UE 115-a may have no access to information regarding which precoders are selected by the network entity 105-a. The UE 115-a may be capable of more efficiently and accurately estimating the channel and decoding downlink data signaling based thereon based on specific precoders used for precoding the downlink signaling. However, over-the-air signaling indicating such precoder information to the UE 115-a may result in significant signaling overhead, increasing latency and power consumption of the wireless communication system 200, and decreasing efficiency and user experience.

In some implementations, according to techniques described herein, the use of deep-learning based precoding may enable the network entity 105-a and the UE 115-a to improve relevant criteria (e.g., channel capacity, interference suppression, distortion suppression, power reduction, among other examples) even subject to one or more limitations (e.g., overall transmission power, transmission power per antenna, nonlinearity at a power amplifier, inter-cell interference, among other examples). For example, the network entity 105-a may support neural network (NN) based channel precoding to increase data communications performance of the wireless communication system 200. NN-based channel precoding may result in effective selection of channel precoders (e.g., channel precoding matrices), resulting in satisfaction of one or more limitations while improving reliability, efficiency, throughput, etc. and limiting interference, distortion, and suppression.

Additionally, or alternatively, communication of NN coefficients between the transmitter (e.g., the network entity 105-a) and the receiver (e.g., the UE 115-a) may be used for both cross-training of the network and reduction of precoding signaling overhead. The UE 115-a may therefore accurately determine which precoder was used for data transmissions (e.g., via the PDSCH), and may successfully perform channel estimation and decoding based on the determined precoder. Such techniques may support higher resolution precoders and decoding. For example, for some wireless communications (e.g., sub-THz communications, where a low quantity of antenna ports at the network entity 105-a may be assumed), the UE 115-a may support high quality channel estimation even for ultra-narrowband precoders (e.g., subcarrier precoders, where a narrowband precoder is applied for a specific subcarrier). In such examples, the UE 115-a may be able to support high resolution precoders, and may successfully decode narrowband transmissions without experiencing the channel estimate degradation at channel boundaries.

The network entity 105-a may support NN-based channel precoding selection according to techniques described herein. The network entity 105-a may perform network training (e.g., may train the NN and determine NN coefficients 245) using received channel and noise estimations as inputs. Thus, the trained NN may output (e.g., according to the NN coefficients 245) a precoder based on the input channel estimation information. The network entity 105-a may select (e.g., calculate based on the NN) a precoder that may improve performance of the wireless communications system 200, and may indicate the NN coefficients 245 to the UE 115-a.

In some examples, the UE 115-a may transmit an indication of one or more NN capacities, capabilities, restrictions, or criteria (or a combination thereof) associated with the UE 115-a to the network entity 105-a. The network entity 105-a may train the NN according to the information received from the UE 115-a. For example, the network entity 105-a may include a precoder selector 225. The network entity 105-a may input the channel information 230 (e.g., an estimated channel response) to the precoder selector 225, and the precoder selector 225 may calculate a channel precoder. In some examples, the estimated channel response may be based on receiving one or more sounding reference signals (SRSs) from the UE 115-a, and performing one or more measurements (e.g., performing a channel estimation). The network entity 105-a may transmit (e.g., to the UE 115-a) an indication of the NN coefficients 245 (e.g., which may be based on the inputted channel information 230, the training of the NN, the capability information provided by the UE 115-a, or any combination thereof).

The network entity 105-a may transmit one or more un-precoded (e.g., or wideband precoded) DMRSs 215 and one or more precoded (e.g., narrowband precoded) PDSCH signals 240 to the UE 115-a. For example, the network entity 105-a may include a digital encoder 210 that may encode information 205 (e.g., information bits corresponding to data signaling). The network entity 105-a may also include a digital precoder 220, which may precode the output of the digital encoder 210 according to the channel precoder calculated by the precoder selector 225. The digital precoder 220 may therefore generate the one or more precoded PDSCH signals 240 using the precoder indicated by the precoder selector 225. The network entity 105-a may multiplex (e.g., utilizing the multiplexor 235) one or more un-precoded (e.g., or wideband precoded) DMRSs 215 and the one or more precoded (e.g., narrowband precoded) PDSCH signals 240 for transmission to the UE 115-a. The network entity 105-a may transmit the one or more un-precoded (e.g., or wideband precoded) DMRSs 215 and the one or more precoded PDSCH signals 240 to the UE 115-a according to the precoding and the multiplexing.

The UE 115-a may apply the NN to the estimated channel (e.g., the unprecoded channel response) to evaluate the precoder, and may apply the precoding to estimate the precoded channel (e.g., the precoded channel response), which may be used for demodulation of the PDSCH. For example, the UE 115-a may perform a channel estimate using the channel estimator 250 (e.g., may estimate channel and noise conditions according to the DMRSs). The UE 115-a may input the channel estimate into the NN-based precoder section performed by the precoder selector 260. For instance, the UE 115-a may apply the NN coefficients 245 received from the network entity 105-a, and may input the channel estimate (e.g., of the unprecoded or wideband precoded channel based on the unprecoded or wideband precoded DMRSs) into the precoder selector 260. The precoder selector 260 may output (e.g., according to the NN) the precoder (e.g., the narrowband precoder) used by the network entity 105-a to precode the PDSCHs. The UE 115-a may apply the precoder selected by the precoder selector 260 and the channel estimate generated by the channel estimator 250 as inputs or the precoded channel calculator. That is, the UE 115-a may calculate the precoded channel according to the precoder used by the network entity 105-a and according to the channel estimate of the unprecoded channel. The precoded channel calculator 255 may output the precoded channel estimate, which may be used by the demodulator 265 to demodulate the data signaling carried by the PDSCH. The digital decoder 270 may decode the demodulated data signaling.

In some examples, techniques described herein may support improved performance in high mobility scenarios. For example, using the trained NN, the UE 115-a may rapidly update the precoder (e.g., a slot-based resolution), by applying the trained NN for each new channel realization. In some examples, techniques described herein may support improved performance in large delay spread scenarios. For example, using the trained NN, an ultra-narrowband precoder may be applied at the network entity 105-a (e.g., per subcarrier) while high-quality channel estimate may remain at the UE 115-a. In some examples, techniques described herein may support reduced signaling overhead. For example, an update of the NN coefficients 245 may occur in a low periodicity (e.g., or remain constant for the communications between the network entity 105-a and the UE 115-a), even for high mobility scenarios. In such a case, use of the trained NN may enable the network entity 105-a to rapidly update the precoder (e.g., the narrowband precoder) with very low control overheads. The use of the trained NN may also result in improvements for non-convex, multiple-objective issues relating to precoder selection for downlink transmissions.

Figure 3:
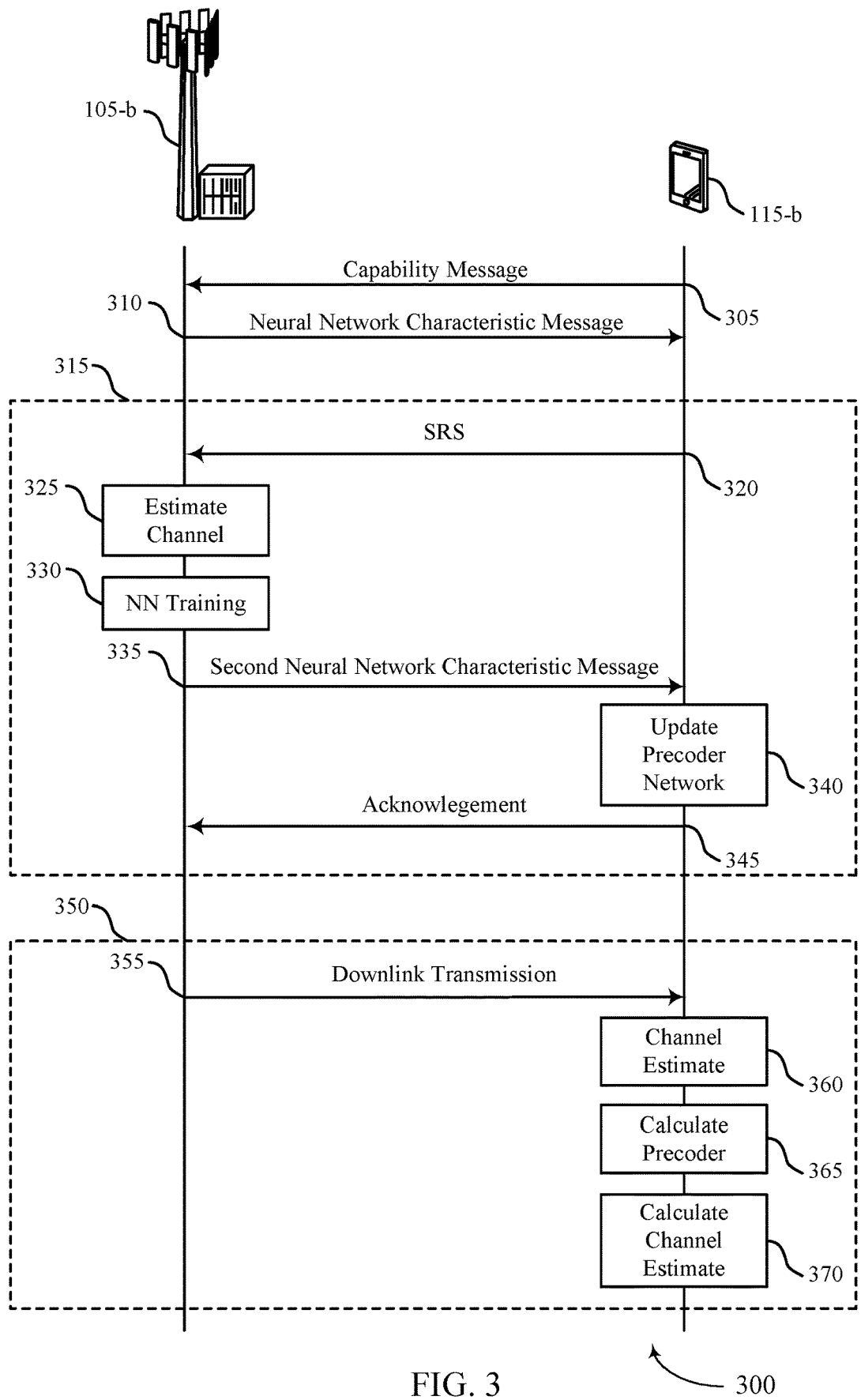
FIG. 3 shows an example of a process flow that supports machine learning based channel precoder selection for downlink in accordance with one or more aspects of the present disclosure.

FIG. 3 shows an example of a process flow 300 that supports machine learning based channel precoder selection for downlink in accordance with one or more aspects of the present disclosure. In some examples, the process flow 300 may implement or be implemented by aspects of the wireless communications system 100, the wireless communications system 200, or both. For example, the process flow 300 may include a network entity 105-b and a UE 115-b, which may be examples of corresponding devices described herein with respect to FIGS. 1 and 2. As depicted by the process flow 300, the network entity 105-b and the UE 115-b may support NN-based channel precoding selection for improved data communications performance. Alternative examples of the following may be implemented, where some steps are performed in a different order than described or are not performed at all. In some cases, steps may include additional features not mentioned below, or further steps may be added. Although the network entity 105-b and the UE 115-b are shown performing the operations of the process flow 300, some aspects of some operations may also be performed by one or more other wireless devices.

At 305, the UE 115-b may transmit, and the network entity 105-b may receive, a capability message. The capability message may indicate one or more NN characteristics supported by the UE. For example, the capability message may indicate one or more capability or restrictions indicating the capabilities, capacities, restrictions, and criteria of (e.g., associated with) the UE 115-b. In some examples, the capability and restriction messaging may include one or more NN characteristics supported by the UE 115-b, such as an indication of the NN dimensionality capabilities the UE 115-b supports. The NN characteristics (e.g., such as dimensionality capabilities), may include a quantity of layers included in the NN model, a connectivity value of an NN model supported by the UE 115-b, among other examples. In some examples, the NN characteristics may be selected from predefined NN structures. For example, a set of predefined NN structures may be configured (e.g., via control signaling) at the UE 115-b, or may be defined in one or more standards. The UE 115-b may select one or more of the supported NN structures, or specific NN characteristics, from the predefined set of candidate NN structures or predefined candidate NN characteristics, and may indicate the selected NN structure or NN characteristics via the capability message.

In some examples, the capability message may include an indication of one or more supported precoders (e.g., sets of precoders, narrowband precoders) for selection. The indicated supported precoders for selection may indicate which precoders are supported by the UE 115-*b* (e.g., which precoders can be used by the network entity for transmitting downlink transmissions at 355, and then utilized by the UE 115-*b* for demodulation and decoding). In some examples, the UE 115-*b* may down select the precoders indicated in the capability message from an existing or predefined set of candidate precoders. For example, the UE 115-*b* may be configured (e.g., via control signaling) with a set of candidate precoders from which to select supported precoders, or the set of candidate precoders may be defined in one or more standards documents. In some examples, the UE 115-*b* may indicate (e.g., via the capability message) that it supports any precoder output from the NN, or that the UE 115-*b* is limited in that it supports only a particular type of precoder (e.g., limited to unitary precoders), or that the UE 115-*b* is not limited to particular types of precoders (e.g., is unlimited).

At 310, the network entity 105-*b* may transmit, and the UE 115-*b* may receive, a neural network characteristic message. The neural network characteristic message may include an indication of one or more NN channel precoder coefficients of a neural network model corresponding to precoder calculation based on channel estimation. For example, the network entity 105-*b* may utilize information received from the UE 115-*b* in the capability message to calculate or select a NN-based channel precoder (e.g., a narrowband precoder). In some examples, the network entity 105-*b* may select the precoder from a set of one or more predefined precoders indicated by the UE 115-*b* in the capability message. In some other examples, the network entity 105-*b* may select the precoder from a set of one or more predefined precoders. For example, the network entity 105-*b* may select the NN characteristics (e.g., may generate a NN model) to satisfy the NN characteristics supported by the UE 115-*b* (e.g., the network entity 105-*b* may adjust the NN model to have a quantity of layers or nodes, a connection value or quantity of connections, or the like, based on the capability message). In some examples, the NN characteristic message (e.g., or other control signaling) may indicate a selection from a set of predefined precoders, a selection from an extended (e.g., defined by the network entity 105-*b*) set of precoders, or an indication of a type of precoder, or an indication that any linear precoder is to be supported). The network entity 105-*b* may train the NN to select or calculate a precoder (e.g., a precoder matrix) according to a defined granularity in the frequency domain. In some examples, there may not be a restriction on the granularity since the network entity 105-*b* may train the NN to calculate or select the precoder (e.g., for the entire bandwidth) with one or more (e.g., multiple) granularities with respect to the channel realization.

The network entity 105-*b* may subsequently apply the narrowband precoder to one or more downlink signals (e.g., PDSCH signals) destined for the UE 115-*b*. In some examples, the network entity 105-*b* may not precode one or more DMRS signals destined for the UE 115-*b* while, in other examples, the network entity 105-*b* may precode the one or more DMRS signals according to a second precoder (e.g., a wideband precoder) that is different from the narrowband precoder. The network entity 105-*b* may subsequently transmit one or more NN channel precoder coefficients associated with the calculated narrowband precoder to the UE 115-*b*. For example, in response to transmitting the capability and restriction messaging to the network entity 105-*b*, the UE 115-*b* may receive a NN characteristic message that may indicate one or more NN channel precoder coefficients (e.g., NN coefficients). The UE 115-*b* may subsequently update a narrowband precoder of the UE 115-*b* using the NN channel precoder coefficients such that the precoder of the UE 115-*b* may accurately decode and demodulate downlink signals received from the network entity 105-*b*.

In some examples, the UE 115-*b* may receive, from the network entity 105-*b*, control signaling indicating a granularity of the narrowband precoder indicated by the output of the NN model. The UE 115-*b* may identify the precoder used by the network entity 105-*b*, and decode the downlink transmission, according to the indicated granularity (e.g., the UE 115-*b* may apply the narrowband precoder to the downlink transmission in accordance with the granularity, which may indicate a range of frequency resources (e.g., an RBG size, a quantity of RBs) to which the precoder applies). In some examples, the NN may be trained (e.g., at 330) to select or calculate a precoding matrix according to the defined granularity. In some examples, the NN model may not be restricted by any granularity, and the NN model may be trained (e.g., at 330) to calculate the precoding for an entire bandwidth with multiple granularities with respect to channel realization. The control signaling may include the NN characteristic message (e.g., at 310), or may be separate control signaling (e.g., higher layer signaling, or dynamic signaling).

In some examples, the UE 115-*b* may receive control signaling indicating a mapping between the output of the NN model and one or more precoders. For instance, the NN characteristic message, or other control signaling (e.g., higher layer signaling, or dynamic signaling) may indicate a mapping between what the NN model outputs according to the indicated NN coefficients, and which precoder is indicated by the outputs.

The network entity 105-*b* may precode a downlink transmission according to a NN model corresponding to the NN characteristic message (e.g., the NN model is based on the NN coefficients indicated at 310). The precoding procedure may be performed as described in greater detail with reference to FIG. 2 (e.g., using the digital encoder 210, the precoder selector 225, the digital precoder 220, and the multiplexor 235). The network entity 105-*b* may apply a narrowband precoder to one or more PDSCH transmissions, and may apply a wideband precoder (e.g., or no precoder) to one or more DMRSs, and may transmit the DMRSs and the PDSCHs at 355. The UE 115-*b* may then perform a channel estimate (e.g., at 360) for the unprecoded channel, calculate a precoder using the NN (e.g., at 365), and calculate the precoded channel estimate (e.g., at 370). Thus, the UE 115-*b* may use the NN characteristics indicated at 310 to calculate the precoder used by the network entity 105-*b* for the downlink transmission, and may demodulate and decode the downlink transmission accordingly, as described herein.

In some examples, the network entity 105-*b* and the UE 115-*b* may perform a coefficient update procedure at 315. At 320, the UE 115-*b* may transmit, and the network entity 105-*b* may receive, one or more reference signals (e.g., sounding reference signals). At 325, the network entity 105-*b* may perform channel estimation utilizing the one or more reference signals received from the UE 115-*b*. At 330, the network entity 105-*b* may perform precoder NN training for a desired (e.g., preferred or selected) criteria. For example, the network entity 105-*b* may utilize information associated with the channel estimation, as well as information received from the UE 115-*b* in the capability message, to calculate or update the NN coefficients. Additionally, the network entity 105-*b* may update the NN model by updating one or more NN characteristics, such as a quantity of layers of the NN, updating a quantity of nodes or connectivity, by updating the values of the NN channel precoder coefficients, among other examples. The network entity 105-*b* may transmit, at 335, a NN characteristics message (e.g., a second NN characteristic message) including an indication of the updated NN coefficients to the UE 115-*b*, an indication of updated layers of the NN model, or the like.

At 340, the UE 115-*b* may update the NN according to the updated NN coefficients indicated at 335. At 345, the UE 115-*b* may transmit a feedback message (e.g., an acknowledgement (ACK) message) indicating successful receipt of the NN characteristic message at 335.

In some examples, the UE 115-*b* and the network entity 105-*b* may perform the coefficient update (e.g., at 315) periodically, or multiple times over time. The coefficient update may be periodic (e.g., configured by the network entity 105-*b* or defined in one or more standards), or may be triggered by the satisfying of one or more conditions (e.g., if a success rate may be positive).

In some examples, the UE 115-*b* and the network entity 105-*b* may perform a precoding calculation procedure at 350. The UE 115-*b* and the network entity 105-*b* may perform the precoding calculation for each downlink transmission, without performing a coefficient update procedure (e.g., at 315) but based on the NN characteristic message (e.g., transmitted at 310), after a most recent coefficient update procedure, among other examples.

At 355, the network entity 105-*b* may transmit, and the UE 115-*b* may receive, one or more downlink transmissions. For example, the network entity 105-*b* may precode the downlink transmission according to the capability message, using a NN model based on the NN characteristics indicated at 310. The network entity 105-*b* may transmit one or more downlink signals (e.g., one or more PDSCH signals) and one or more DMRSs to the UE 115-*b*. The downlink signals may be precoded according to the narrowband precoder indicated by the NN model, while the DMRSs may not be precoded (e.g., or may be wideband precoded).

At 360, the UE 115-*b* may perform a first channel estimation. For example, the UE 115-*b* may perform a channel estimation to estimate channel and noise conditions according to the one or more received DMRSs included in the downlink transmission (e.g., an unprecoded channel estimate). In some examples, the UE 115-*b* may perform the channel estimate using a channel estimator component of the UE 115-*b*.

At 365, the UE 115-*b* may determine (e.g., calculate, select) the narrowband precoder. For example, the UE 115-*a* may apply the channel estimate (e.g., the unprecoded channel response) as an input to the NN model (e.g., according to the NN coefficients) to evaluate the narrowband precoder utilized by the network entity 105-*b* to precode the one or more PDSCH signals. In some examples, the UE 115-*b* may include a precoder selector to determine (e.g., calculate, select) the narrowband precoder according to the NN model. In some examples, the UE 115-*b* may select the narrowband precoder from the received one or more candidate precoders indicated by the network entity 105-*b*. In some examples, the NN model may output the precoder itself (e.g., a precoding matrix). In some examples, the NN model may output an indicator, which the UE 115-*b* may map to a precoded of a set of candidate precoders (e.g., according to a mapping indicated by the network entity 105-*b* via the NN characteristic message, or other control signaling).

At 370, the UE 115-*b* may calculate a channel estimate. For example, the UE 115-*b* may calculate one or more precoded channels (e.g., the PDSCH) according to the precoder used by the network entity 105-*b* and according to the channel estimate of the unprecoded channel. In some examples, the UE 115-*b* may apply the narrowband precoder selected by the precoder selector of the UE 115-*b* and the channel estimate generated by the channel estimator of the UE 115-*b* as inputs to a precoded channel calculator to estimate (e.g., calculate) the narrowband precoded channel. That is, the UE 115-*b* may utilize the unprecoded channel estimate generated at 360 and the precoder calculated at 365 to estimate the precoded channel at 370, and thereby demodulate the PDSCH transmissions. The UE 115-*b* may then decode the downlink data transmissions received via the PDSCHs based on the demodulation.

Figure 4:
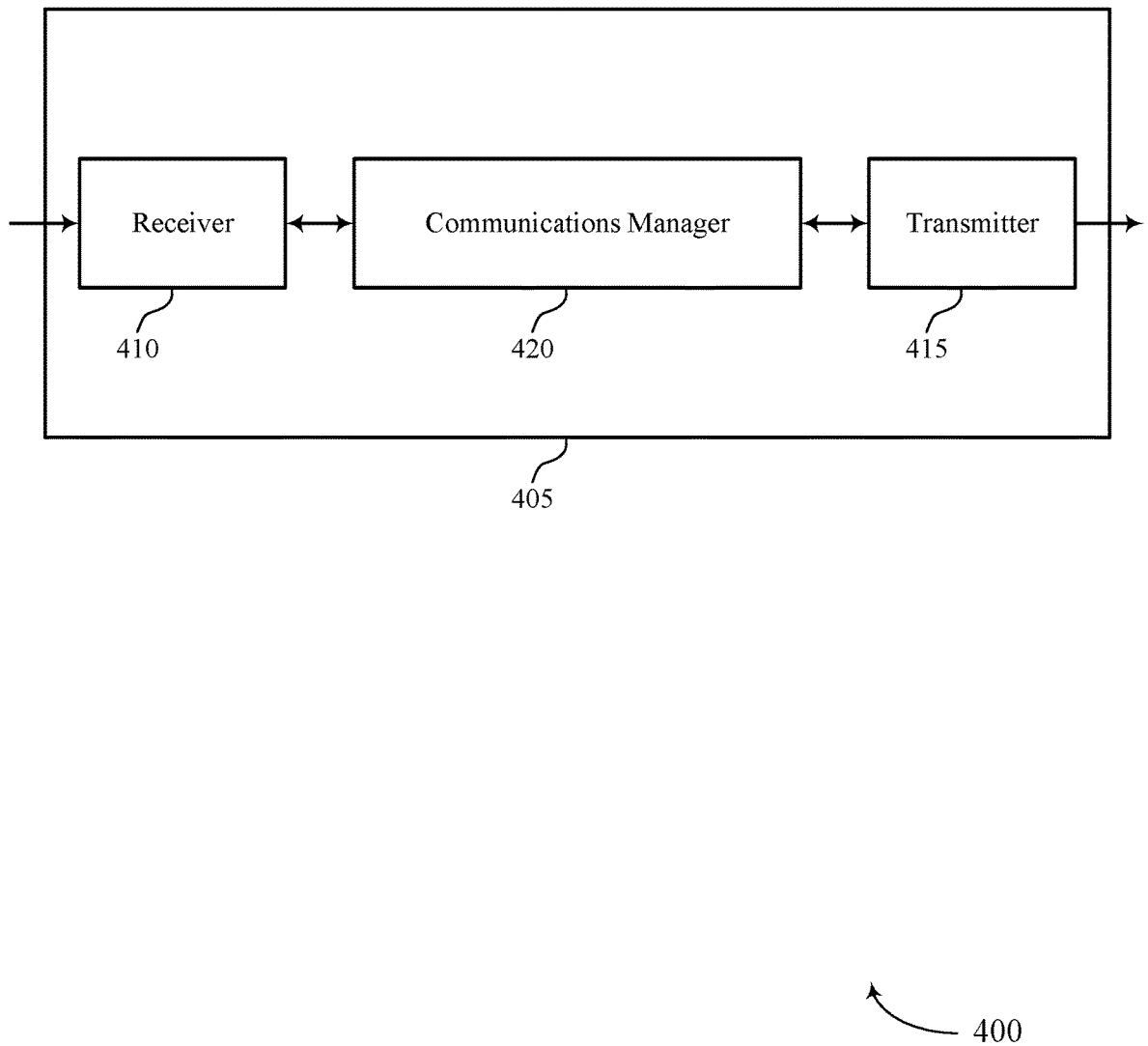
FIGS. 4 and 5 show block diagrams of devices that support machine learning based channel precoder selection for downlink in accordance with one or more aspects of the present disclosure.

FIG. 4 shows a block diagram 400 of a device 405 that supports machine learning based channel precoder selection for downlink in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to machine learning based channel precoder selection for downlink). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to machine learning based channel precoder selection for downlink). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of machine learning based channel precoder selection for downlink as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for transmitting a capability message indicating one or more neural network characteristics supported by the UE. The communications manager 420 is capable of, configured to, or operable to support a means for receiving, based on transmitting the capability message, a neural network characteristic message indicating one or more neural network coefficients of a neural network model corresponding to precoder calculation based on channel estimation. The communications manager 420 is capable of, configured to, or operable to support a means for receiving downlink signaling and one or more demodulation reference signals, where a narrowband precoder corresponding to the downlink signaling is different than a precoding status corresponding to the one or more demodulation reference signals. The communications manager 420 is capable of, configured to, or operable to support a means for decoding the downlink signaling according to an output from the neural network model indicating the narrowband precoder of the downlink signaling, wherein the output from the neural network model is based on the one or more neural network coefficients and an input to the neural network model including one or more channel estimation values, the output indicating the narrowband precoder of the downlink signaling.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing, reduced power consumption, and more efficient utilization of communication resources, among other advantages.

Figure 5:
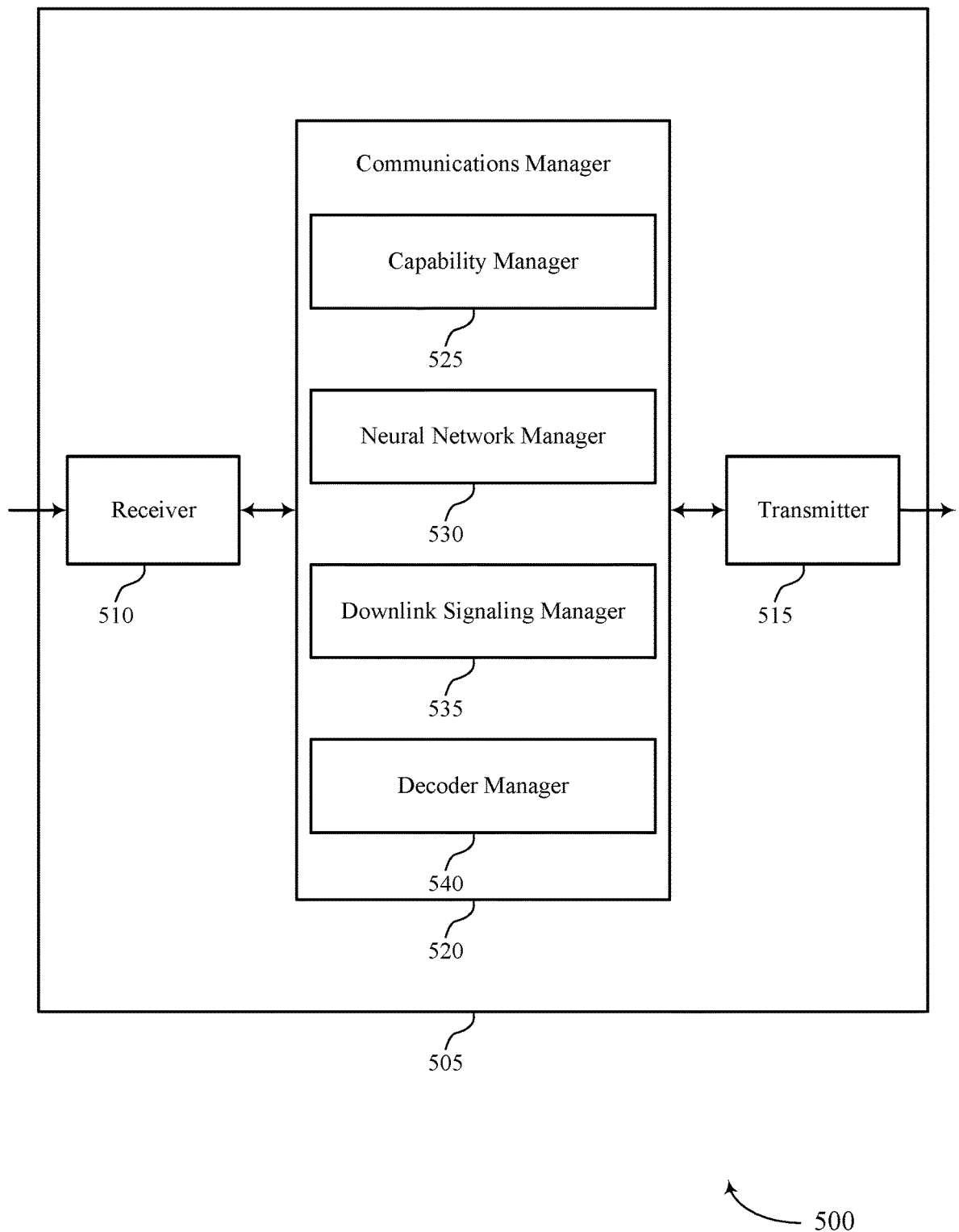

FIG. 5 shows a block diagram 500 of a device 505 that supports machine learning based channel precoder selection for downlink in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to machine learning based channel precoder selection for downlink). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to machine learning based channel precoder selection for downlink). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of machine learning based channel precoder selection for downlink as described herein. For example, the communications manager 520 may include a capability manager 525, a neural network manager 530, a downlink signaling manager 535, a decoder manager 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The capability manager 525 is capable of, configured to, or operable to support a means for transmitting a capability message indicating one or more neural network characteristics supported by the UE. The neural network manager 530 is capable of, configured to, or operable to support a means for receiving, based on transmitting the capability message, a neural network characteristic message indicating one or more neural network coefficients of a neural network model corresponding to precoder calculation based on channel estimation. The downlink signaling manager 535 is capable of, configured to, or operable to support a means for receiving downlink signaling and one or more demodulation reference signals, where a narrowband precoder corresponding to the downlink signaling is different than a precoding status corresponding to the one or more demodulation reference signals. The decoder manager 540 is capable of, configured to, or operable to support a means for decoding the downlink signaling according to an output from the neural network model indicating the narrowband precoder of the downlink signaling, wherein the output from the neural network model is based on the one or more neural network coefficients and an input to the neural network model including one or more channel estimation values.

Figure 6:
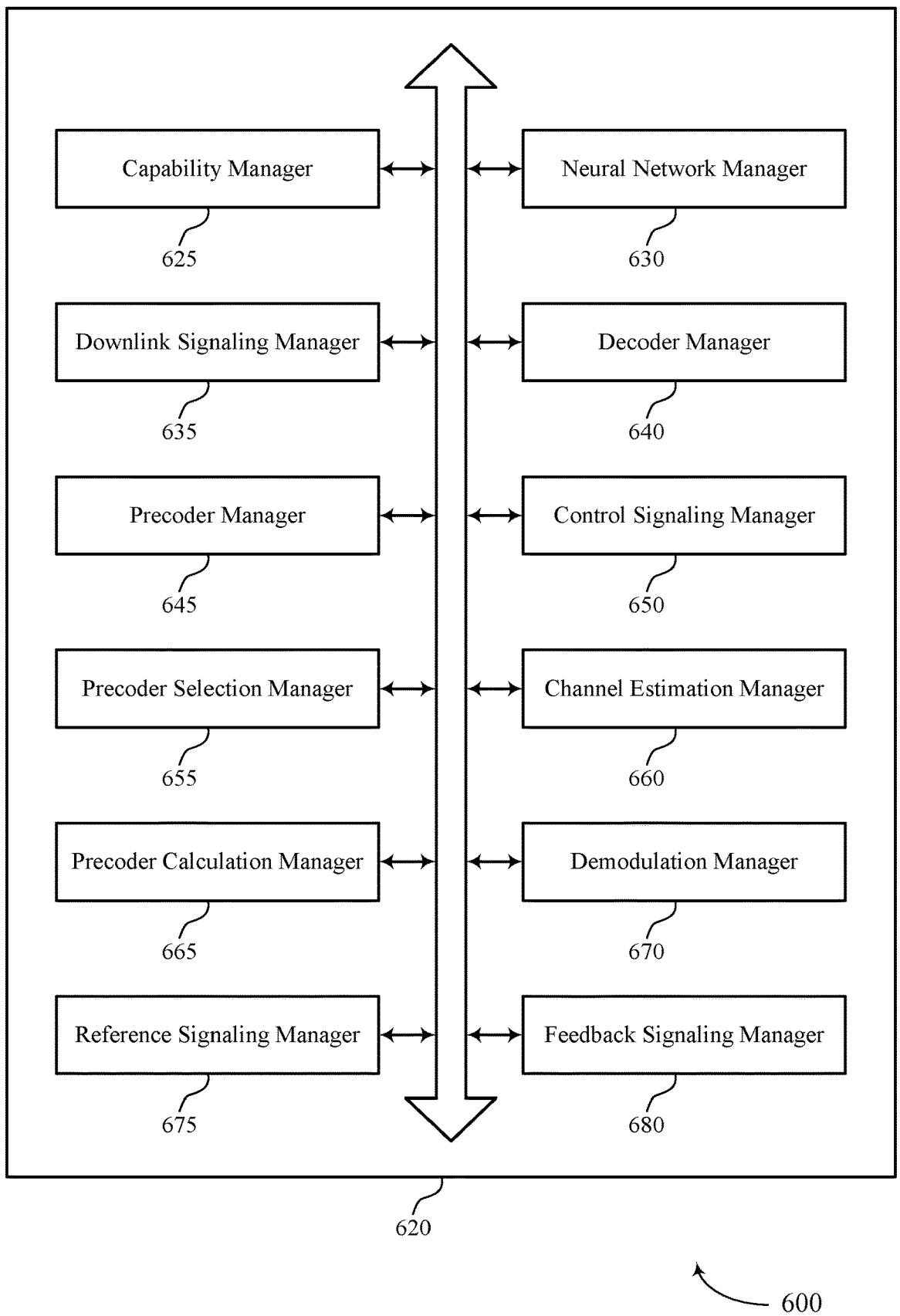
FIG. 6 shows a block diagram of a communications manager that supports machine learning based channel precoder selection for downlink in accordance with one or more aspects of the present disclosure.

FIG. 6 shows a block diagram 600 of a communications manager 620 that supports machine learning based channel precoder selection for downlink in accordance with one or more aspects of the present disclosure. The communications manager 620 may be an example of aspects of a communications manager 420, a communications manager 520, or both, as described herein. The communications manager 620, or various components thereof, may be an example of means for performing various aspects of machine learning based channel precoder selection for downlink as described herein. For example, the communications manager 620 may include a capability manager 625, a neural network manager 630, a downlink signaling manager 635, a decoder manager 640, a precoder manager 645, a control signaling manager 650, a precoder selection manager 655, a channel estimation manager 660, a precoder calculation manager 665, a demodulation manager 670, a reference signaling manager 675, a feedback signaling manager 680, or any combination thereof. Each of these components, or components or sub-components thereof (e.g., one or more processors, one or more memories), may communicate, directly or indirectly, with one another (e.g., via one or more buses).

The communications manager 620 may support wireless communications in accordance with examples as disclosed herein. The capability manager 625 is capable of, configured to, or operable to support a means for transmitting a capability message indicating one or more neural network characteristics supported by the UE. The neural network manager 630 is capable of, configured to, or operable to support a means for receiving, based on transmitting the capability message, a neural network characteristic message indicating one or more neural network coefficients of a neural network model corresponding to precoder calculation based on channel estimation. The downlink signaling manager 635 is capable of, configured to, or operable to support a means for receiving downlink signaling and one or more demodulation reference signals, where a narrowband precoder corresponding to the downlink signaling is different than a precoding status corresponding to the one or more demodulation reference signals. The decoder manager 640 is capable of, configured to, or operable to support a means for decoding the downlink signaling according to an output from the neural network model indicating the narrowband precoder of the downlink signaling, wherein the output from the neural network is based on the one or more neural network coefficients and an input to the neural network model including one or more channel estimation values.

In some examples, the neural network manager 630 is capable of, configured to, or operable to support a means for transmitting, via the capability message, an indication of a quantity of layers of the neural network model, a connectivity value of the neural network model supported by the UE, or a combination thereof.

In some examples, the precoder manager 645 is capable of, configured to, or operable to support a means for transmitting, via the capability message, an indication of one or more precoders that the UE supports for decoding the downlink signaling, the one or more precoders including the narrowband precoder of the downlink signaling.

In some examples, the control signaling manager 650 is capable of, configured to, or operable to support a means for receiving control signaling indicating a mapping between the output of the neural network model and one or more precoders including the narrowband precoder. In some examples, the precoder selection manager 655 is capable of, configured to, or operable to support a means for selecting the narrowband precoder from the one or more precoders according to the output of the neural network model based on the mapping, where decoding the downlink signaling is based on the selecting.

In some examples, the control signaling manager 650 is capable of, configured to, or operable to support a means for receiving control signaling indicating a granularity of the narrowband precoder indicated by the output of the neural network model, where decoding the downlink signaling is based on applying the narrowband precoder according to the indicated granularity.

In some examples, the channel estimation manager 660 is capable of, configured to, or operable to support a means for performing a channel estimate according to the one or more demodulation reference signals. In some examples, the neural network manager 630 is capable of, configured to, or operable to support a means for inputting one or more parameter values corresponding to the channel estimate into the neural network model. In some examples, the precoder calculation manager 665 is capable of, configured to, or operable to support a means for calculating the narrowband precoder for the downlink signaling according to the output indicating the narrowband precoder. In some examples, the demodulation manager 670 is capable of, configured to, or operable to support a means for demodulating the downlink signaling based on the channel estimate and the calculated narrowband precoder.

In some examples, the reference signaling manager 675 is capable of, configured to, or operable to support a means for transmitting one or more reference signals. In some examples, the neural network manager 630 is capable of, configured to, or operable to support a means for receiving, based on transmitting the one or more reference signals, a second neural network characteristic message indicating one or more updated neural network coefficients of the neural network model. In some examples, the feedback signaling manager 680 is capable of, configured to, or operable to support a means for transmitting a feedback message indicating successful receipt of the second neural network characteristic message, where receiving the downlink signaling is based on the one or more updated neural network coefficients of the neural network model.

In some examples, the precoding status of the one or more demodulation reference signals is associated with a wideband precoder that is different than the narrowband precoder.

In some examples, the one or more demodulation reference signals are not precoded according to the precoding status of the one or more demodulation reference signals.

Figure 7:
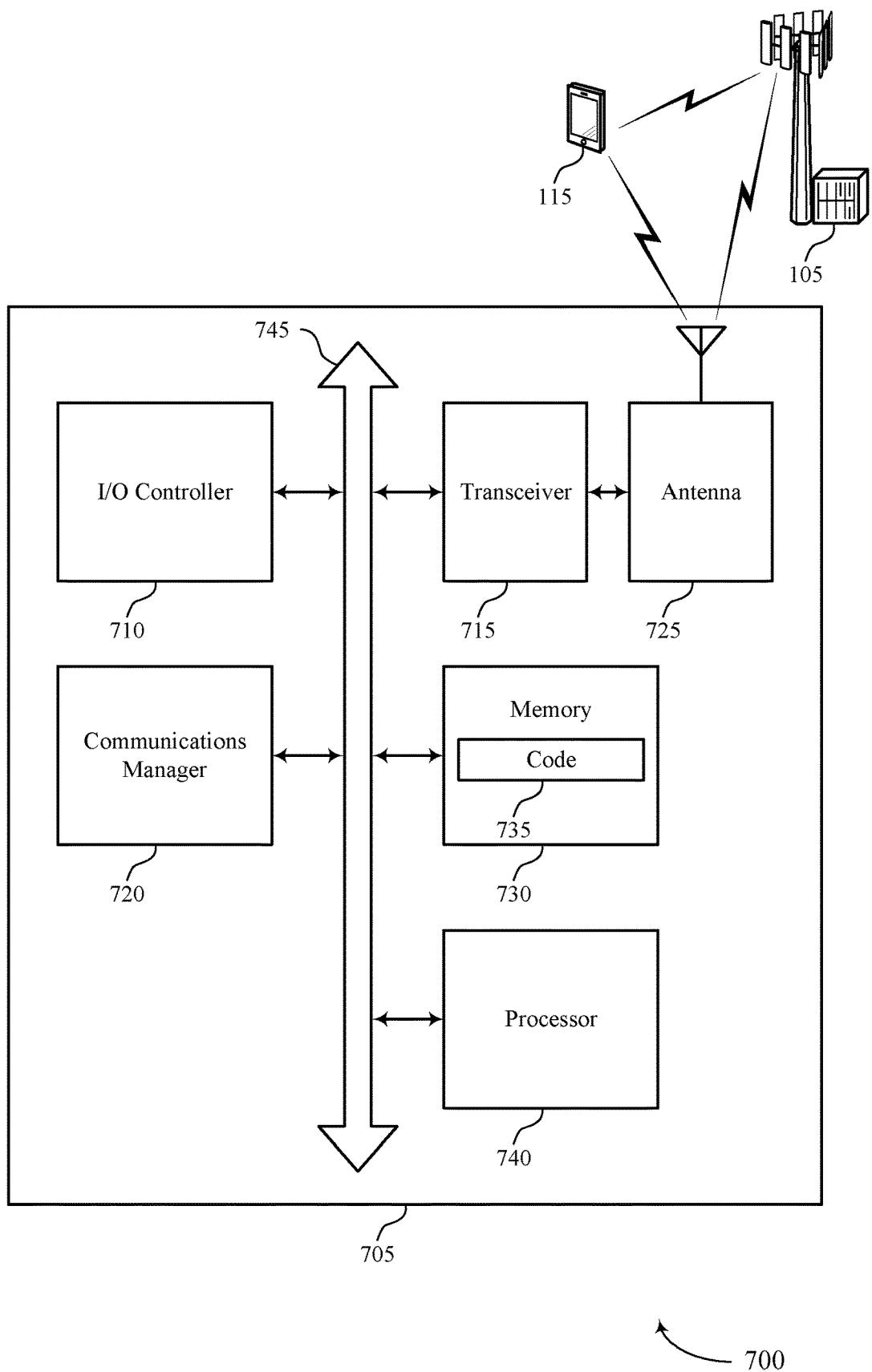
FIG. 7 shows a diagram of a system including a device that supports machine learning based channel precoder selection for downlink in accordance with one or more aspects of the present disclosure.

FIG. 7 shows a diagram of a system 700 including a device 705 that supports machine learning based channel precoder selection for downlink in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting machine learning based channel precoder selection for downlink). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communications in accordance with examples as disclosed herein. For example, the communications manager 720 is capable of, configured to, or operable to support a means for transmitting a capability message indicating one or more neural network characteristics supported by the UE. The communications manager 720 is capable of, configured to, or operable to support a means for receiving, based on transmitting the capability message, a neural network characteristic message indicating one or more neural network coefficients of a neural network model corresponding to precoder calculation based on channel estimation. The communications manager 720 is capable of, configured to, or operable to support a means for receiving downlink signaling and one or more demodulation reference signals, where a narrowband precoder corresponding to the downlink signaling is different than a precoding status corresponding to the one or more demodulation reference signals. The communications manager 720 is capable of, configured to, or operable to support a means for decoding the downlink signaling according to an output from the neural network model indicating the narrowband precoder of the downlink signaling, wherein the output from the neural network model is based on the one or more neural network coefficients and an input to the neural network model including one or more channel estimation values.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of machine learning based channel precoder selection for downlink as described herein, or the at least one processor 740 and the at least one memory 730 may be otherwise configured to, individually or collectively, perform or support such operations.

Figure 8:
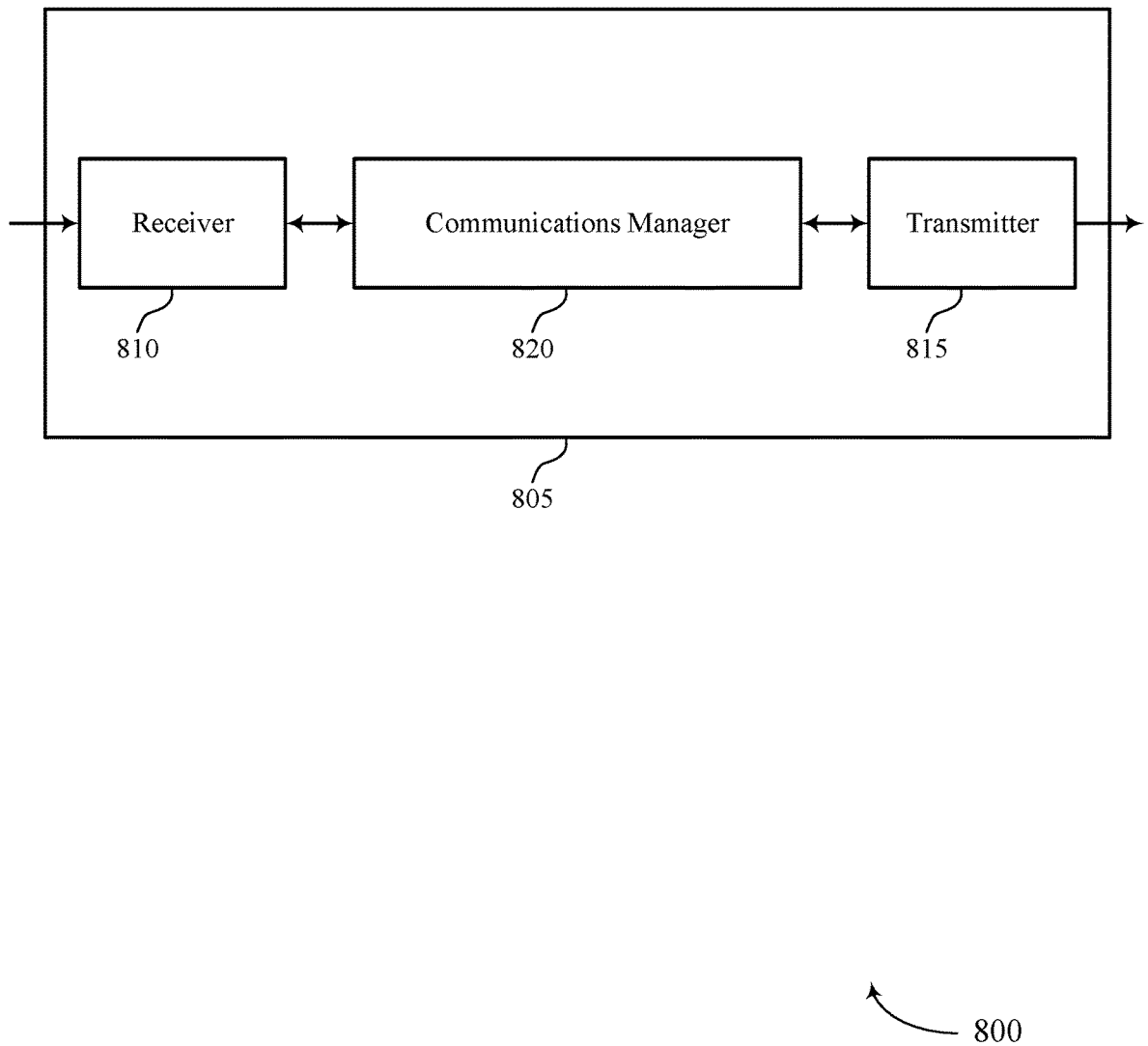
FIGS. 8 and 9 show block diagrams of devices that support machine learning based channel precoder selection for downlink in accordance with one or more aspects of the present disclosure.

FIG. 8 shows a block diagram 800 of a device 805 that supports machine learning based channel precoder selection for downlink in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of machine learning based channel precoder selection for downlink as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving a capability message indicating one or more neural network characteristics supported by a UE. The communications manager 820 is capable of, configured to, or operable to support a means for transmitting, based on receiving the capability message, a neural network characteristic message indicating one or more neural network coefficients of a neural network model corresponding to precoder calculation based on channel estimation. The communications manager 820 is capable of, configured to, or operable to support a means for precoding downlink signaling according to a narrowband precoder, where a precoding status corresponding to one or more demodulation reference signals is different than the narrowband precoder. The communications manager 820 is capable of, configured to, or operable to support a means for transmitting the downlink signaling and the one or more demodulation reference signals.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing, reduced power consumption, and more efficient utilization of communication resources, among other advantages.

Figure 9:
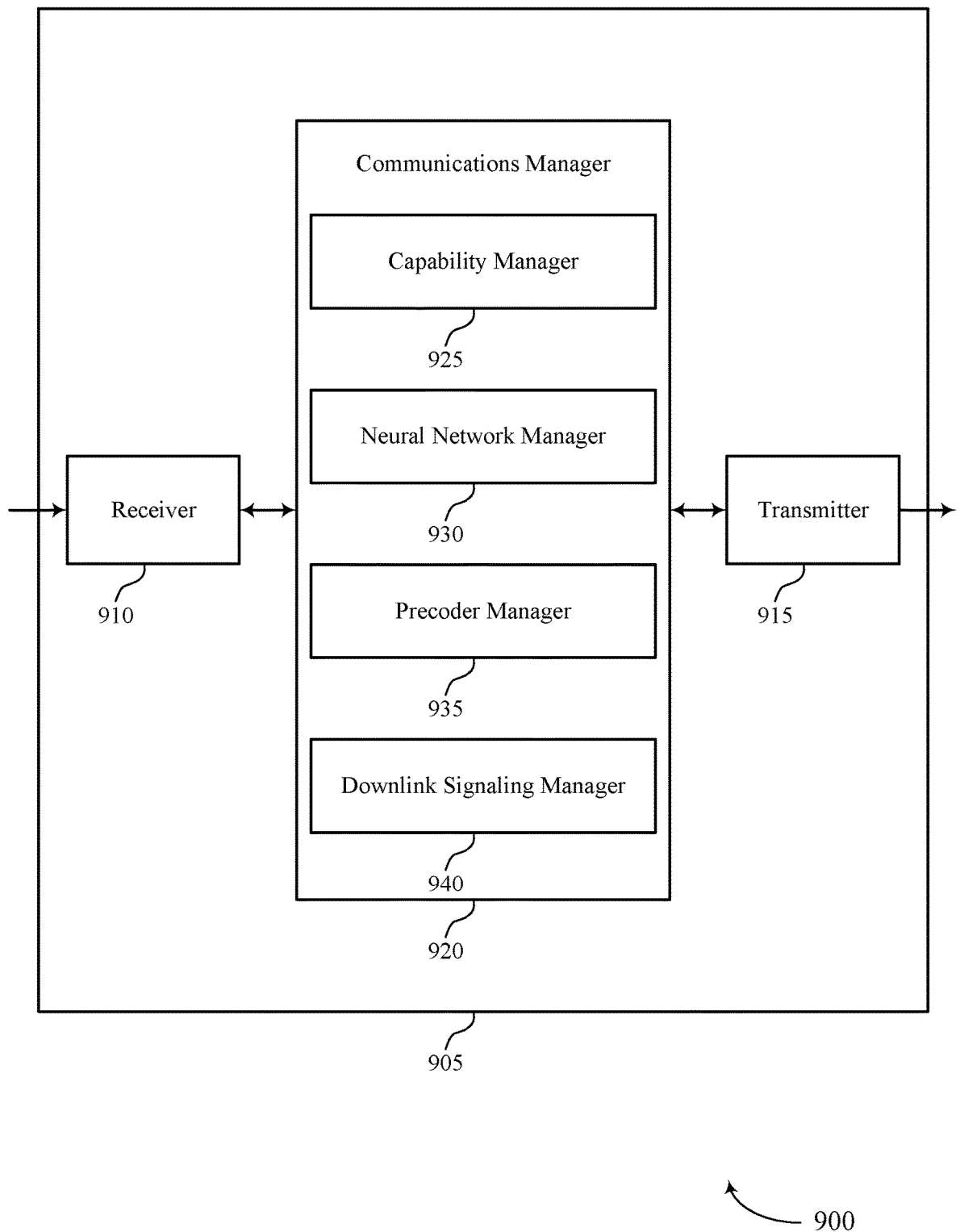

FIG. 9 shows a block diagram 900 of a device 905 that supports machine learning based channel precoder selection for downlink in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of machine learning based channel precoder selection for downlink as described herein. For example, the communications manager 920 may include a capability manager 925, a neural network manager 930, a precoder manager 935, a downlink signaling manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The capability manager 925 is capable of, configured to, or operable to support a means for receiving a capability message indicating one or more neural network characteristics supported by a UE. The neural network manager 930 is capable of, configured to, or operable to support a means for transmitting, based on receiving the capability message, a neural network characteristic message indicating one or more neural network coefficients of a neural network model corresponding to precoder calculation based on channel estimation. The precoder manager 935 is capable of, configured to, or operable to support a means for precoding downlink signaling according to a narrowband precoder, where a precoding status corresponding to one or more demodulation reference signals is different than the narrowband precoder. The downlink signaling manager 940 is capable of, configured to, or operable to support a means for transmitting the downlink signaling and the one or more demodulation reference signals.

Figure 10:
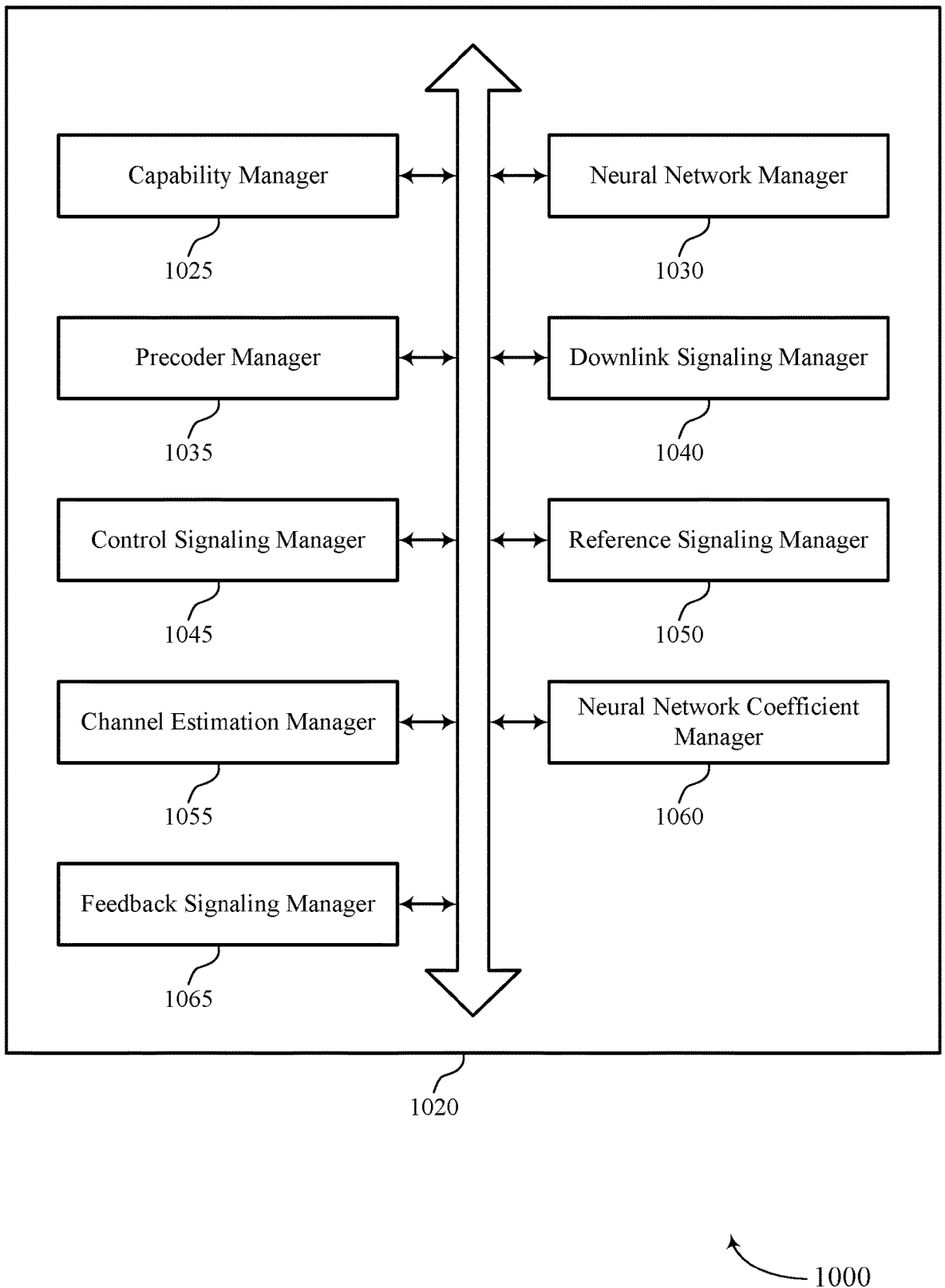
FIG. 10 shows a block diagram of a communications manager that supports machine learning based channel precoder selection for downlink in accordance with one or more aspects of the present disclosure.

FIG. 10 shows a block diagram 1000 of a communications manager 1020 that supports machine learning based channel precoder selection for downlink in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of machine learning based channel precoder selection for downlink as described herein. For example, the communications manager 1020 may include a capability manager 1025, a neural network manager 1030, a precoder manager 1035, a downlink signaling manager 1040, a control signaling manager 1045, a reference signaling manager 1050, a channel estimation manager 1055, a neural network coefficient manager 1060, a feedback signaling manager 1065, or any combination thereof. Each of these components, or components or sub-components thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The capability manager 1025 is capable of, configured to, or operable to support a means for receiving a capability message indicating one or more neural network characteristics supported by a UE. The neural network manager 1030 is capable of, configured to, or operable to support a means for transmitting, based on receiving the capability message, a neural network characteristic message indicating one or more neural network coefficients of a neural network model corresponding to precoder calculation based on channel estimation. The precoder manager 1035 is capable of, configured to, or operable to support a means for precoding downlink signaling according to a narrowband precoder, where a precoding status corresponding to one or more demodulation reference signals is different than the narrowband precoder. The downlink signaling manager 1040 is capable of, configured to, or operable to support a means for transmitting the downlink signaling and the one or more demodulation reference signals.

In some examples, the neural network manager 1030 is capable of, configured to, or operable to support a means for receiving, via the capability message, an indication of a quantity of layers of the neural network model, a connectivity value of the neural network model, or a combination thereof, where the one or more neural network coefficients are based on the quantity of layers, the connectivity value, or both.

In some examples, the precoder manager 1035 is capable of, configured to, or operable to support a means for receiving, via the capability message, an indication of one or more precoders that the UE supports for decoding the downlink signaling, the one or more precoders including the narrowband precoder of the downlink signaling.

In some examples, the control signaling manager 1045 is capable of, configured to, or operable to support a means for transmitting control signaling including a set of candidate precoders including the one or more precoders, where receiving the capability message is based on transmitting the control signaling including the set of candidate precoders.

In some examples, the control signaling manager 1045 is capable of, configured to, or operable to support a means for transmitting control signaling indicating a mapping between an output of the neural network model and one or more precoders including the narrowband precoder.

In some examples, the control signaling manager 1045 is capable of, configured to, or operable to support a means for transmitting control signaling indicating a granularity of the narrowband precoder indicated by an output of the neural network model.

In some examples, the reference signaling manager 1050 is capable of, configured to, or operable to support a means for receiving one or more reference signals from the UE. In some examples, the channel estimation manager 1055 is capable of, configured to, or operable to support a means for performing a channel estimation based on the one or more reference signals. In some examples, the neural network manager 1030 is capable of, configured to, or operable to support a means for updating the one or more neural network coefficients of the neural network model based on the channel estimation. In some examples, the neural network coefficient manager 1060 is capable of, configured to, or operable to support a means for transmitting a second neural network characteristic message indicating the one or more updated neural network coefficients of the neural network model. In some examples, the feedback signaling manager 1065 is capable of, configured to, or operable to support a means for receiving a feedback message indicating successful receipt of the second neural network characteristic message.

In some examples, the precoding status of the one or more demodulation reference signals is associated with a wideband precoder that is different than the narrowband precoder.

In some examples, the one or more demodulation reference signals are not precoded according to the precoding status of the one or more demodulation reference signals.

Figure 11:
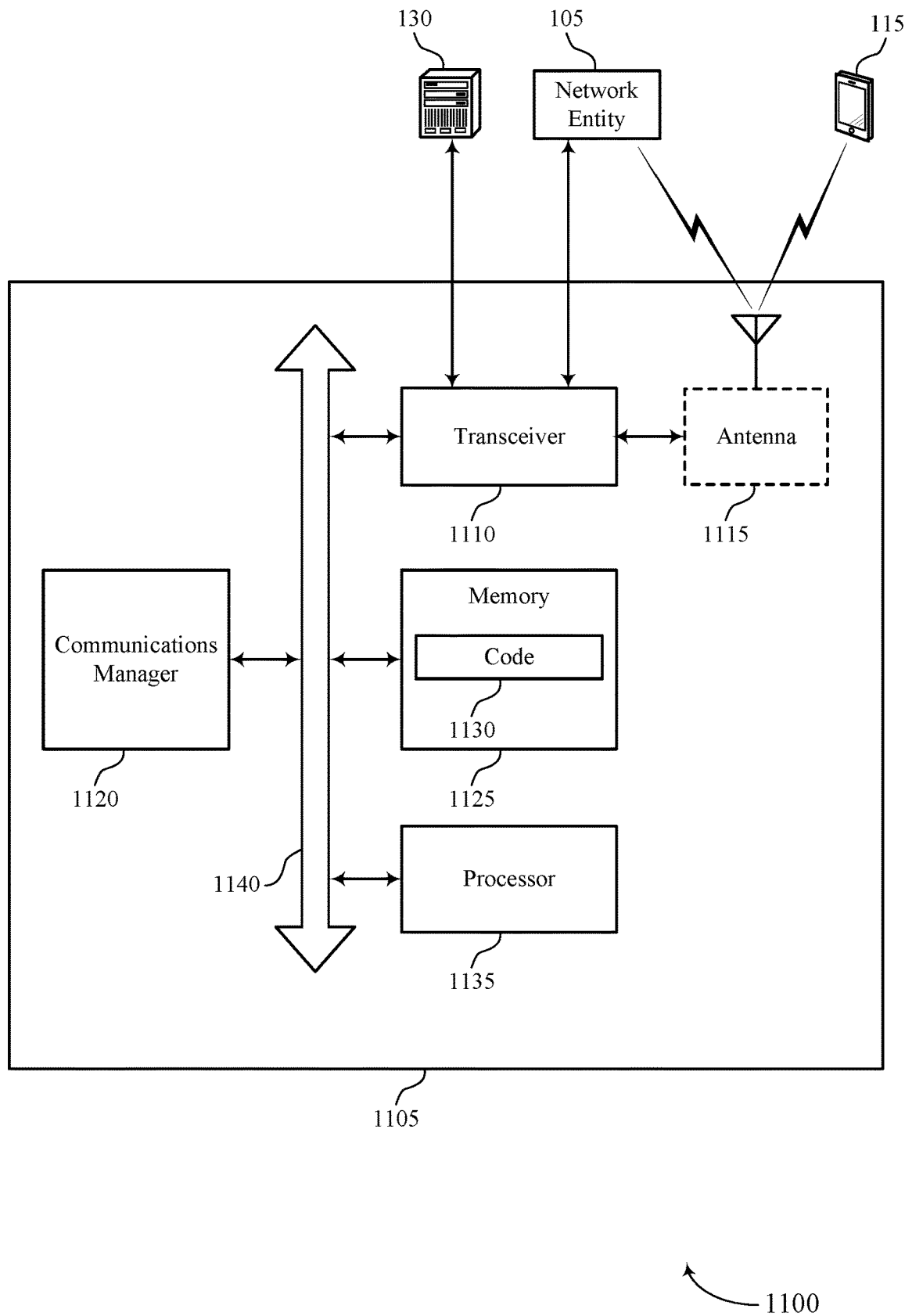
FIG. 11 shows a diagram of a system including a device that supports machine learning based channel precoder selection for downlink in accordance with one or more aspects of the present disclosure.

FIG. 11 shows a diagram of a system 1100 including a device 1105 that supports machine learning based channel precoder selection for downlink in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting machine learning based channel precoder selection for downlink). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some implementations, the at least one processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the at least one processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for receiving a capability message indicating one or more neural network characteristics supported by a UE. The communications manager 1120 is capable of, configured to, or operable to support a means for transmitting, based on receiving the capability message, a neural network characteristic message indicating one or more neural network coefficients of a neural network model corresponding to precoder calculation based on channel estimation. The communications manager 1120 is capable of, configured to, or operable to support a means for precoding downlink signaling according to a narrowband precoder, where a precoding status corresponding to one or more demodulation reference signals is different than the narrowband precoder. The communications manager 1120 is capable of, configured to, or operable to support a means for transmitting the downlink signaling and the one or more demodulation reference signals.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of machine learning based channel precoder selection for downlink as described herein, or the at least one processor 1135 and the at least one memory 1125 may be otherwise configured to, individually or collectively, perform or support such operations.

Figure 12:
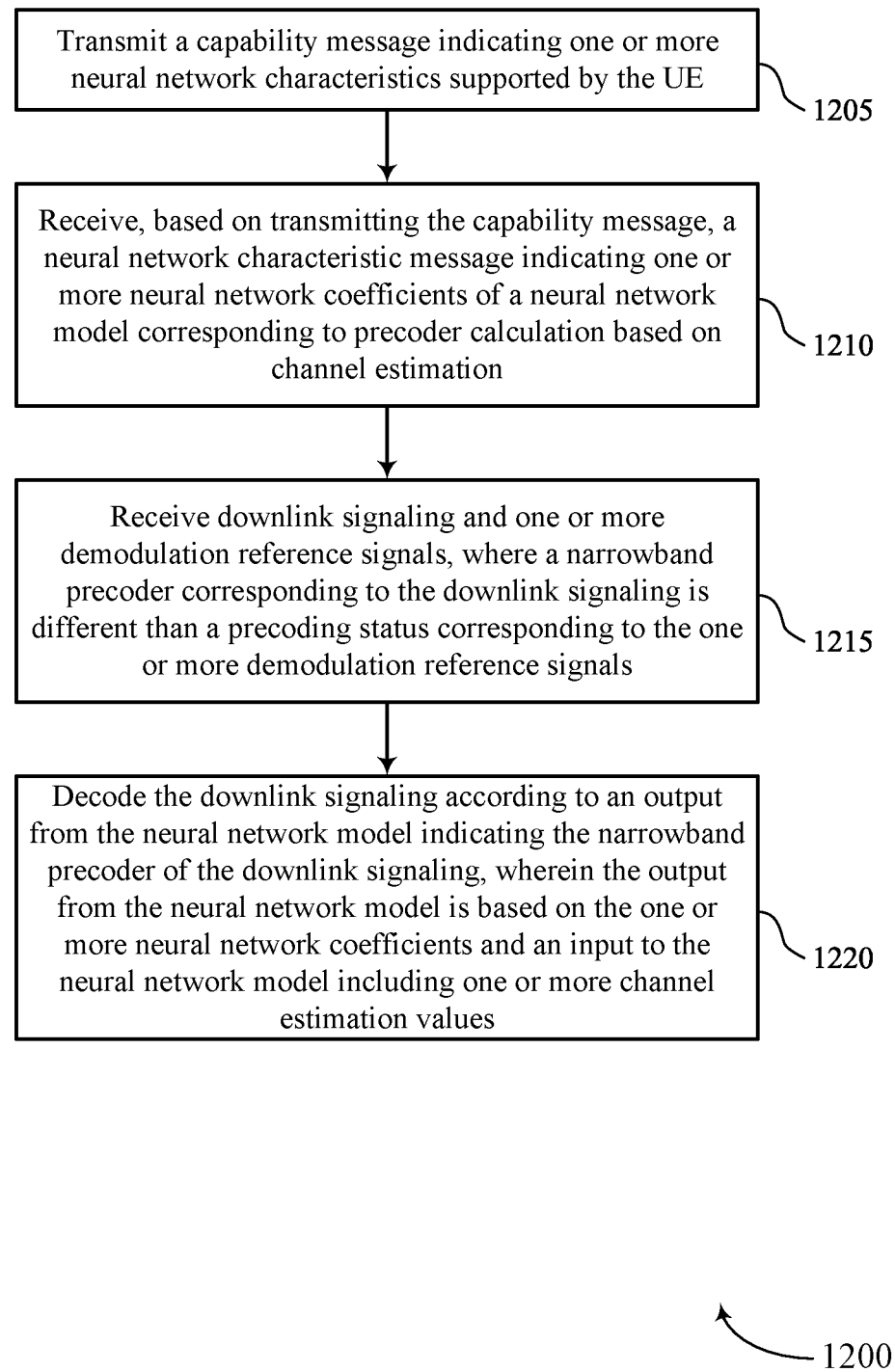
FIGS. 12 through 15 show flowcharts illustrating methods that support machine learning based channel precoder selection for downlink in accordance with one or more aspects of the present disclosure.

FIG. 12 shows a flowchart illustrating a method 1200 that supports machine learning based channel precoder selection for downlink in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting a capability message indicating one or more neural network characteristics supported by the UE. The operations of block 1205 may be performed in accordance with examples as disclosed herein. In some examples, aspects of the operations of 1205 may be performed by a capability manager 625 as described with reference to FIG. 6.

At 1210, the method may include receiving, based on transmitting the capability message, a neural network characteristic message indicating one or more neural network coefficients of a neural network model corresponding to precoder calculation based on channel estimation. The operations of block 1210 may be performed in accordance with examples as disclosed herein. In some examples, aspects of the operations of 1210 may be performed by a neural network manager 630 as described with reference to FIG. 6.

At 1215, the method may include receiving downlink signaling and one or more demodulation reference signals, where a narrowband precoder corresponding to the downlink signaling is different than a precoding status corresponding to the one or more demodulation reference signals. The operations of block 1215 may be performed in accordance with examples as disclosed herein. In some examples, aspects of the operations of 1215 may be performed by a downlink signaling manager 635 as described with reference to FIG. 6.

At 1220, the method may include decoding the downlink signaling according to an output from the neural network model indicating the narrowband precoder of the downlink signaling, where the output from the neural network model is based on the one or more neural network coefficients and an input to the neural network model including one or more channel estimation values. The operations of block 1220 may be performed in accordance with examples as disclosed herein. In some examples, aspects of the operations of 1220 may be performed by a decoder manager 640 as described with reference to FIG. 6.

Figure 13:
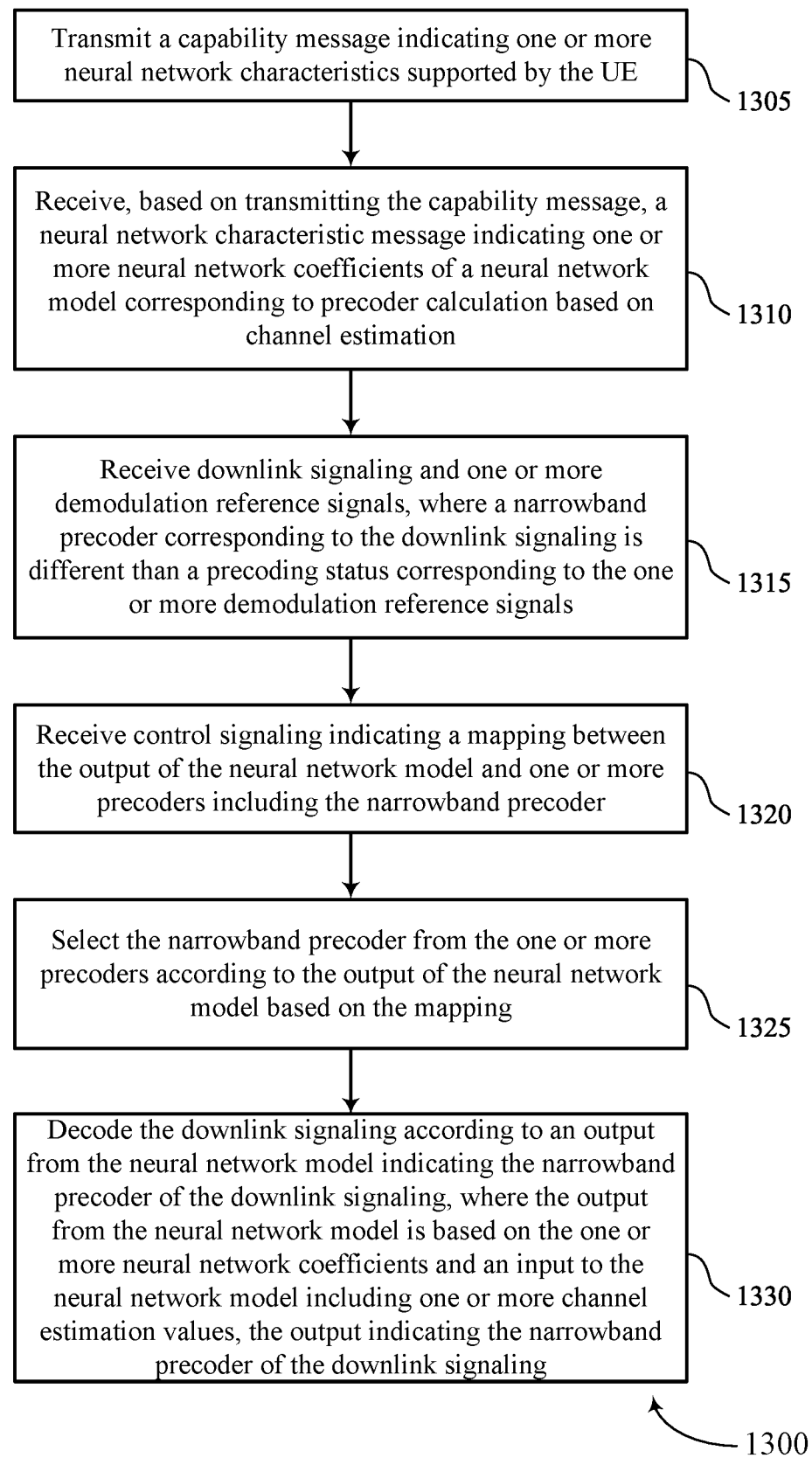

FIG. 13 shows a flowchart illustrating a method 1300 that supports machine learning based channel precoder selection for downlink in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting a capability message indicating one or more neural network characteristics supported by the UE. The operations of block 1305 may be performed in accordance with examples as disclosed herein. In some examples, aspects of the operations of 1305 may be performed by a capability manager 625 as described with reference to FIG. 6.

At 1310, the method may include receiving, based on transmitting the capability message, a neural network characteristic message indicating one or more neural network coefficients of a neural network model corresponding to precoder calculation based on channel estimation. The operations of block 1310 may be performed in accordance with examples as disclosed herein. In some examples, aspects of the operations of 1310 may be performed by a neural network manager 630 as described with reference to FIG. 6.

At 1315, the method may include receiving downlink signaling and one or more demodulation reference signals, where a narrowband precoder corresponding to the downlink signaling is different than a precoding status corresponding to the one or more demodulation reference signals. The operations of block 1315 may be performed in accordance with examples as disclosed herein. In some examples, aspects of the operations of 1315 may be performed by a downlink signaling manager 635 as described with reference to FIG. 6.

At 1320, the method may include receiving control signaling indicating a mapping between the output of the neural network model and one or more precoders including the narrowband precoder. The operations of block 1320 may be performed in accordance with examples as disclosed herein. In some examples, aspects of the operations of 1320 may be performed by a control signaling manager 650 as described with reference to FIG. 6.

At 1325, the method may include selecting the narrowband precoder from the one or more precoders according to the output of the neural network model based on the mapping. The operations of block 1325 may be performed in accordance with examples as disclosed herein. In some examples, aspects of the operations of 1325 may be performed by a precoder selection manager 655 as described with reference to FIG. 6.

At 1330, the method may include decoding the downlink signaling according to an output from the neural network model indicating the narrowband precoder of the downlink signaling, where the output from the neural network model is based on the one or more neural network coefficients and an input to the neural network model including one or more channel estimation values, The operations of block 1330 may be performed in accordance with examples as disclosed herein. In some examples, aspects of the operations of 1330 may be performed by a decoder manager 640 as described with reference to FIG. 6.

Figure 14:
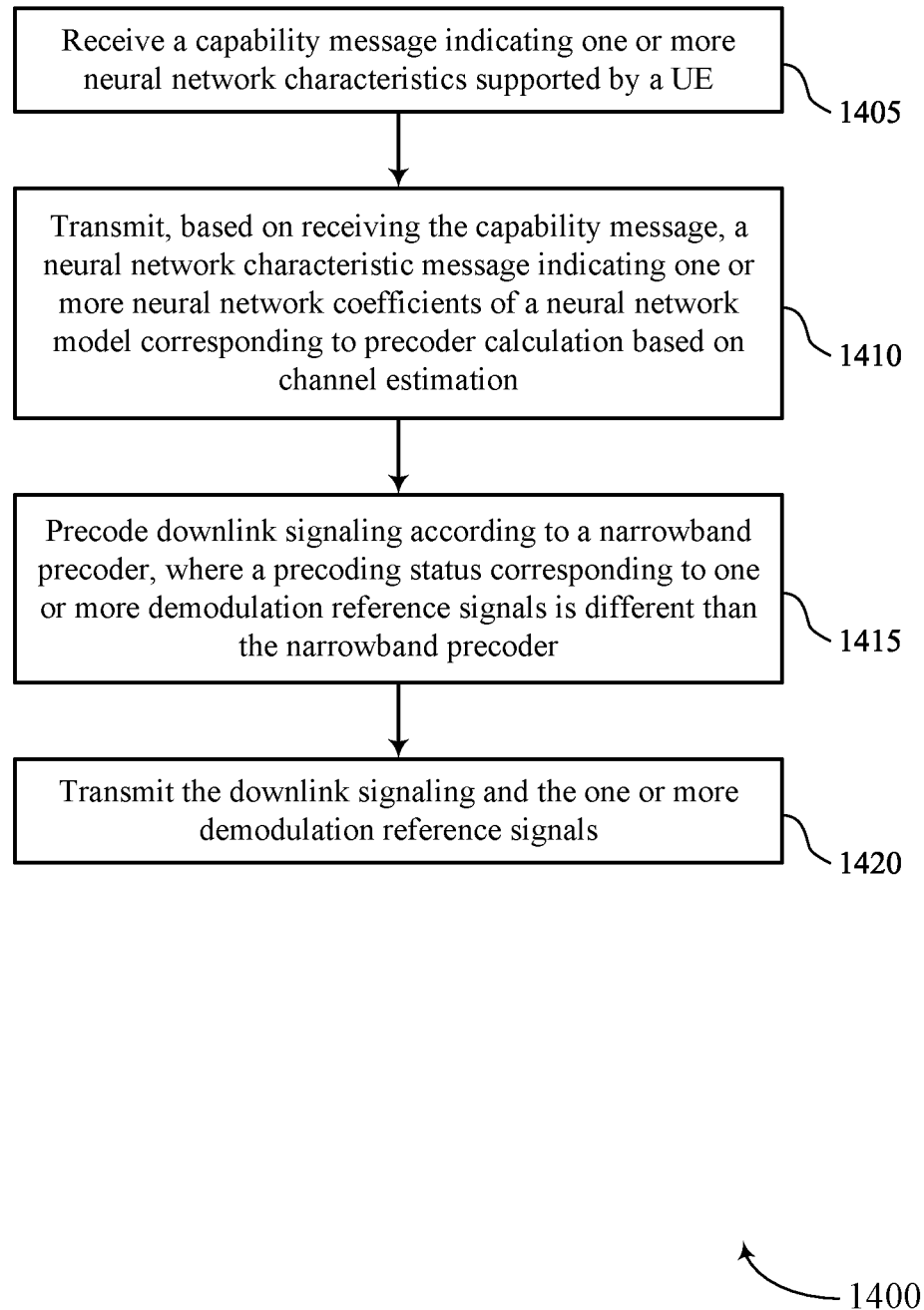

FIG. 14 shows a flowchart illustrating a method 1400 that supports machine learning based channel precoder selection for downlink in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include receiving a capability message indicating one or more neural network characteristics supported by a UE. The operations of block 1405 may be performed in accordance with examples as disclosed herein. In some examples, aspects of the operations of 1405 may be performed by a capability manager 1025 as described with reference to FIG. 10.

At 1410, the method may include transmitting, based on receiving the capability message, a neural network characteristic message indicating one or more neural network coefficients of a neural network model corresponding to precoder calculation based on channel estimation. The operations of block 1410 may be performed in accordance with examples as disclosed herein. In some examples, aspects of the operations of 1410 may be performed by a neural network manager 1030 as described with reference to FIG. 10.

At 1415, the method may include precoding downlink signaling according to a narrowband precoder, where a precoding status corresponding to one or more demodulation reference signals is different than the narrowband precoder. The operations of block 1415 may be performed in accordance with examples as disclosed herein. In some examples, aspects of the operations of 1415 may be performed by a precoder manager 1035 as described with reference to FIG. 10.

At 1420, the method may include transmitting the downlink signaling and the one or more demodulation reference signals. The operations of block 1420 may be performed in accordance with examples as disclosed herein. In some examples, aspects of the operations of 1420 may be performed by a downlink signaling manager 1040 as described with reference to FIG. 10.

Figure 15:
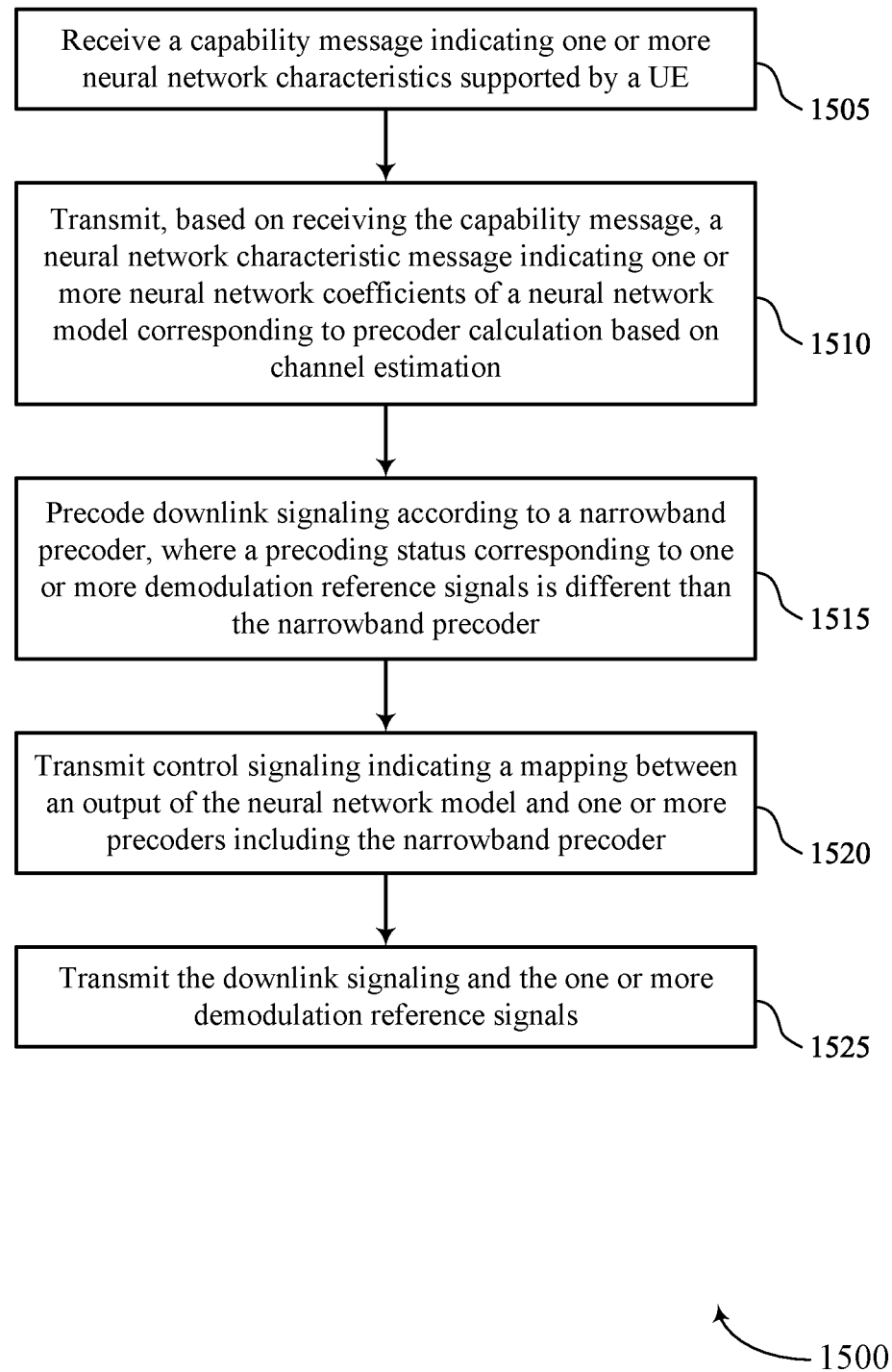

FIG. 15 shows a flowchart illustrating a method 1500 that supports machine learning based channel precoder selection for downlink in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving a capability message indicating one or more neural network characteristics supported by a UE. The operations of block 1505 may be performed in accordance with examples as disclosed herein. In some examples, aspects of the operations of 1505 may be performed by a capability manager 1025 as described with reference to FIG. 10.

At 1510, the method may include transmitting, based on receiving the capability message, a neural network characteristic message indicating one or more neural network coefficients of a neural network model corresponding to precoder calculation based on channel estimation. The operations of block 1510 may be performed in accordance with examples as disclosed herein. In some examples, aspects of the operations of 1510 may be performed by a neural network manager 1030 as described with reference to FIG. 10.

At 1515, the method may include precoding downlink signaling according to a narrowband precoder, where a precoding status corresponding to one or more demodulation reference signals is different than the narrowband precoder. The operations of block 1515 may be performed in accordance with examples as disclosed herein. In some examples, aspects of the operations of 1515 may be performed by a precoder manager 1035 as described with reference to FIG. 10.

At 1520, the method may include transmitting control signaling indicating a mapping between an output of the neural network model and one or more precoders including the narrowband precoder. The operations of block 1520 may be performed in accordance with examples as disclosed herein. In some examples, aspects of the operations of 1520 may be performed by a control signaling manager 1045 as described with reference to FIG. 10.

At 1525, the method may include transmitting the downlink signaling and the one or more demodulation reference signals. The operations of block 1525 may be performed in accordance with examples as disclosed herein. In some examples, aspects of the operations of 1525 may be performed by a downlink signaling manager 1040 as described with reference to FIG. 10.

The following provides an overview of aspects of the present disclosure:

Aspect 1: A method for wireless communications at a UE, comprising: transmitting a capability message indicating one or more neural network characteristics supported by the UE; receiving, based at least in part on transmitting the capability message, a neural network characteristic message indicating one or more neural network coefficients of a neural network model corresponding to precoder calculation based on channel estimation; receiving downlink signaling and one or more demodulation reference signals, wherein a narrowband precoder corresponding to the downlink signaling is different than a precoding status corresponding to the one or more demodulation reference signals; and decoding the downlink signaling according to an output from the neural network model indicating the narrowband precoder of the downlink signaling, wherein the output from the neural network model is based at least in part on the one or more neural network coefficients and an input to the neural network model comprising one or more channel estimation values.

Aspect 2: The method of aspect 1, further comprising: transmitting, via the capability message, an indication of a quantity of layers of the neural network model, a connectivity value of the neural network model supported by the UE, or a combination thereof.

Aspect 3: The method of any of aspects 1 through 2, further comprising: transmitting, via the capability message, an indication of one or more precoders that the UE supports for decoding the downlink signaling, the one or more precoders comprising the narrowband precoder of the downlink signaling.

Aspect 4: The method of any of aspects 1 through 3, further comprising: receiving control signaling indicating a mapping between the output of the neural network model and one or more precoders comprising the narrowband precoder; and selecting the narrowband precoder from the one or more precoders according to the output of the neural network model based at least in part on the mapping, wherein decoding the downlink signaling is based at least in part on the selecting.

Aspect 5: The method of any of aspects 1 through 4, further comprising: receiving control signaling indicating a granularity of the narrowband precoder indicated by the output of the neural network model, wherein decoding the downlink signaling is based at least in part on applying the narrowband precoder according to the indicated granularity.

Aspect 6: The method of any of aspects 1 through 5, further comprising: performing a channel estimate according to the one or more demodulation reference signals; inputting one or more parameter values corresponding to the channel estimate into the neural network model; and calculating the narrowband precoder for the downlink signaling according to the output indicating the narrowband precoder; and wherein demodulating the downlink signaling is based at least in part on the channel estimate and the calculated narrowband precoder.

Aspect 7: The method of any of aspects 1 through 6, further comprising: transmitting one or more reference signals; receiving, based at least in part on transmitting the one or more reference signals, a second neural network characteristic message indicating one or more updated neural network coefficients of the neural network model; and transmitting a feedback message indicating successful receipt of the second neural network characteristic message, wherein receiving the downlink signaling is based at least in part on the one or more updated neural network coefficients of the neural network model.

Aspect 8: The method of any of aspects 1 through 7, wherein the precoding status of the one or more demodulation reference signals is associated with a wideband precoder that is different than the narrowband precoder.

Aspect 9: The method of any of aspects 1 through 7, wherein the one or more demodulation reference signals are not precoded according to the precoding status of the one or more demodulation reference signals.

Aspect 10: A method for wireless communications at a network entity, comprising: receiving a capability message indicating one or more neural network characteristics supported by a UE; transmitting, based at least in part on receiving the capability message, a neural network characteristic message indicating one or more neural network coefficients of a neural network model corresponding to precoder calculation based on channel estimation; precoding downlink signaling according to a narrowband precoder, wherein a precoding status corresponding to one or more demodulation reference signals is different than the narrowband precoder; and transmitting the downlink signaling and the one or more demodulation reference signals.

Aspect 11: The method of aspect 10, further comprising: receiving, via the capability message, an indication of a quantity of layers of the neural network model, a connectivity value of the neural network model, or a combination thereof, wherein the one or more neural network coefficients are based at least in part on the quantity of layers, the connectivity value, or both.

Aspect 12: The method of any of aspects 10 through 11, further comprising: receiving, via the capability message, an indication of one or more precoders that the UE supports for decoding the downlink signaling, the one or more precoders comprising the narrowband precoder of the downlink signaling.

Aspect 13: A UE for wireless communications, comprising one or more memories storing processor-executable code, and one or more processors coupled with the one or more memories and individually or collectively operable to execute the code to cause the UE to perform a method of any of aspects 1 through 9.

Aspect 14: A UE for wireless communications, comprising at least one means for performing a method of any of aspects 1 through 9.

Aspect 15: A non-transitory computer-readable medium storing code for wireless communications, the code comprising instructions executable by a processor to perform a method of any of aspects 1 through 9.

Aspect 16: A network entity for wireless communications, comprising one or more memories storing processor-executable code, and one or more processors coupled with the one or more memories and individually or collectively operable to execute the code to cause the network entity to perform a method of any of aspects 10 through 12.

Aspect 17: A network entity for wireless communications, comprising at least one means for performing a method of any of aspects 10 through 12.

Aspect 18: A non-transitory computer-readable medium storing code for wireless communications, the code comprising instructions executable by a processor to perform a method of any of aspects 10 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A user equipment (UE), comprising:
one or more memories storing processor-executable code; and
one or more processors coupled with the one or more memories and individually or collectively operable to execute the code to cause the UE to:
transmit a capability message indicating one or more neural network characteristics supported by the UE;
receive, based at least in part on transmitting the capability message, a neural network characteristic message indicating one or more neural network coefficients of a neural network model corresponding to precoder calculation based on channel estimation;

receive downlink signaling and one or more demodulation reference signals, wherein a narrowband precoder corresponding to the downlink signaling is different than a precoding status corresponding to the one or more demodulation reference signals; and decode the downlink signaling according to an output from the neural network model indicating the narrowband precoder of the downlink signaling, wherein the output from the neural network model is based at least in part on the one or more neural network coefficients and an input to the neural network model comprising one or more channel estimation values.

2. The UE of claim 1, wherein the one or more processors are individually or collectively further operable to execute the code to cause the UE to:

transmit, via the capability message, an indication of a quantity of layers of the neural network model, a connectivity value of the neural network model supported by the UE, or a combination thereof.

3. The UE of claim 1, wherein the one or more processors are individually or collectively further operable to execute the code to cause the UE to:

transmit, via the capability message, an indication of one or more precoders that the UE supports for decoding the downlink signaling, the one or more precoders comprising the narrowband precoder of the downlink signaling.

4. The UE of claim 1, wherein the one or more processors are individually or collectively further operable to execute the code to cause the UE to:

receive control signaling indicating a mapping between the output of the neural network model and one or more precoders comprising the narrowband precoder; and select the narrowband precoder from the one or more precoders according to the output of the neural network model based at least in part on the mapping, wherein decoding the downlink signaling is based at least in part on the selecting.

5. The UE of claim 1, wherein the one or more processors are individually or collectively further operable to execute the code to cause the UE to:

receive control signaling indicating a granularity of the narrowband precoder indicated by the output of the neural network model, wherein decoding the downlink signaling is based at least in part on applying the narrowband precoder according to the indicated granularity.

6. The UE of claim 1, wherein the one or more processors are individually or collectively further operable to execute the code to cause the UE to:

perform a channel estimate according to the one or more demodulation reference signals;

input one or more parameter values corresponding to the channel estimate into the neural network model;

calculate the narrowband precoder for the downlink signaling according to the output indicating the narrowband precoder; and demodulate the downlink signaling based at least in part on the channel estimate and the calculated narrowband precoder.

7. The UE of claim 1, wherein the one or more processors are individually or collectively further operable to execute the code to cause the UE to:

transmit one or more reference signals;

receive, based at least in part on transmitting the one or more reference signals, a second neural network characteristic message indicating one or more updated neural network coefficients of the neural network model; and transmit a feedback message indicating successful receipt of the second neural network characteristic message, wherein receiving the downlink signaling is based at least in part on the one or more updated neural network coefficients of the neural network model.

8. The UE of claim 1, wherein the precoding status of the one or more demodulation reference signals is associated with a wideband precoder that is different than the narrowband precoder.

9. The UE of claim 1, wherein the one or more demodulation reference signals are not precoded according to the precoding status of the one or more demodulation reference signals.

10. A network entity, comprising:

one or more memories storing processor-executable code; and one or more processors coupled with the one or more memories and individually or collectively operable to execute the code to cause the network entity to:

receive a capability message indicating one or more neural network characteristics supported by a user equipment (UE);

transmit, based at least in part on receiving the capability message, a neural network characteristic message indicating one or more neural network coefficients of a neural network model corresponding to precoder calculation based on channel estimation;

precode downlink signaling according to a narrowband precoder, wherein a precoding status corresponding to one or more demodulation reference signals is different than the narrowband precoder; and transmit the downlink signaling and the one or more demodulation reference signals.

11. The network entity of claim 10, wherein the one or more processors are individually or collectively further operable to execute the code to cause the network entity to:

receive, via the capability message, an indication of a quantity of layers of the neural network model, a connectivity value of the neural network model, or a combination thereof, wherein the one or more neural network coefficients are based at least in part on the quantity of layers, the connectivity value, or both.

12. The network entity of claim 10, wherein the one or more processors are individually or collectively further operable to execute the code to cause the network entity to:

receive, via the capability message, an indication of one or more precoders that the UE supports for decoding the downlink signaling, the one or more precoders comprising the narrowband precoder of the downlink signaling.

13. The network entity of claim 12, wherein the one or more processors are individually or collectively further operable to execute the code to cause the network entity to:

transmit control signaling comprising a set of candidate precoders comprising the one or more precoders, wherein receiving the capability message is based at least in part on transmitting the control signaling comprising the set of candidate precoders.

14. The network entity of claim 10, wherein the one or more processors are individually or collectively further operable to execute the code to cause the network entity to:

transmit control signaling indicating a mapping between an output of the neural network model and one or more precoders comprising the narrowband precoder.

15. The network entity of claim 10, wherein the one or more processors are individually or collectively further operable to execute the code to cause the network entity to:
transmit control signaling indicating a granularity of the narrowband precoder indicated by an output of the neural network model.

16. The network entity of claim 10, wherein the one or more processors are individually or collectively further operable to execute the code to cause the network entity to:
receive one or more reference signals from the UE;
perform a channel estimation based at least in part on the one or more reference signals;
update the one or more neural network coefficients of the neural network model based at least in part on the channel estimation;
transmit a second neural network characteristic message indicating the one or more updated neural network coefficients of the neural network model; and
receive a feedback message indicating successful receipt of the second neural network characteristic message.

17. The network entity of claim 10, wherein the precoding status of the one or more demodulation reference signals is associated with a wideband precoder that is different than the narrowband precoder.

18. The network entity of claim 10, wherein the one or more demodulation reference signals are not precoded according to the precoding status of the one or more demodulation reference signals.

19. A method for wireless communications at a user equipment (UE), comprising:
transmitting a capability message indicating one or more neural network characteristics supported by the UE;
receiving, based at least in part on transmitting the capability message, a neural network characteristic message indicating one or more neural network coefficients of a neural network model corresponding to precoder calculation based on channel estimation;
receiving downlink signaling and one or more demodulation reference signals, wherein a narrowband precoder corresponding to the downlink signaling is different than a precoding status corresponding to the one or more demodulation reference signals; and
decoding the downlink signaling according to an output from the neural network model indicating the narrowband precoder of the downlink signaling, wherein the output from the neural network model is based at least in part on the one or more neural network coefficients and an input to the neural network model comprising one or more channel estimation values.

20. The method of claim 19, further comprising:
transmitting, via the capability message, an indication of a quantity of layers of the neural network model, a connectivity value of the neural network model supported by the UE, or a combination thereof.

21. The method of claim 19, further comprising:
transmitting, via the capability message, an indication of one or more precoders that the UE supports for decoding the downlink signaling, the one or more precoders comprising the narrowband precoder of the downlink signaling.

22. The method of claim 19, further comprising:
receiving control signaling indicating a mapping between the output of the neural network model and one or more precoders comprising the narrowband precoder; and
selecting the narrowband precoder from the one or more precoders according to the output of the neural network model based at least in part on the mapping, wherein decoding the downlink signaling is based at least in part on the selecting.

23. The method of claim 19, further comprising:
receiving control signaling indicating a granularity of the narrowband precoder indicated by the output of the neural network model, wherein decoding the downlink signaling is based at least in part on applying the narrowband precoder according to the indicated granularity.

24. The method of claim 19, further comprising:
performing a channel estimate according to the one or more demodulation reference signals;
inputting one or more parameter values corresponding to the channel estimate into the neural network model;
calculating the narrowband precoder for the downlink signaling according to the output indicating the narrowband precoder; and
demodulating the downlink signaling based at least in part on the channel estimate and the calculated narrowband precoder.

25. The method of claim 19, further comprising:
transmitting one or more reference signals;
receiving, based at least in part on transmitting the one or more reference signals, a second neural network characteristic message indicating one or more updated neural network coefficients of the neural network model; and
transmitting a feedback message indicating successful receipt of the second neural network characteristic message, wherein receiving the downlink signaling is based at least in part on the one or more updated neural network coefficients of the neural network model.

26. The method of claim 19, wherein the precoding status of the one or more demodulation reference signals is associated with a wideband precoder that is different than the narrowband precoder.

27. The method of claim 19, wherein the one or more demodulation reference signals are not precoded according to the precoding status of the one or more demodulation reference signals.

28. A method for wireless communications at a network entity, comprising:
receiving a capability message indicating one or more neural network characteristics supported by a user equipment (UE);
transmitting, based at least in part on receiving the capability message, a neural network characteristic message indicating one or more neural network coefficients of a neural network model corresponding to precoder calculation based on channel estimation;
precoding downlink signaling according to a narrowband precoder, wherein a precoding status corresponding to one or more demodulation reference signals is different than the narrowband precoder; and
transmitting the downlink signaling and the one or more demodulation reference signals.

29. The method of claim 28, further comprising:
receiving, via the capability message, an indication of a quantity of layers of the neural network model, a connectivity value of the neural network model, or a combination thereof, wherein the one or more neural network coefficients are based at least in part on the quantity of layers, the connectivity value, or both.

30. The method of claim 28, further comprising:
receiving, via the capability message, an indication of one or more precoders that the UE supports for decoding the downlink signaling, the one or more precoders comprising the narrowband precoder of the downlink signaling.

\* \* \* \* \*